US012764241B2

(12) United States Patent
Yamada et al.

(10) Patent No.: US 12,764,241 B2
(45) Date of Patent: Oct. 13, 2026

(54) IMAGE READING APPARATUS AND IMAGE FORMING APPARATUS

(71) Applicant: CANON KABUSHIKI KAISHA, Tokyo (JP)

(72) Inventors: Kaname Yamada, Chiba (JP); Masahito Ikeda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 18/785,432

(22) Filed: Jul. 26, 2024

(65) Prior Publication Data

US 2024/0388666 A1 Nov. 21, 2024

Related U.S. Application Data

(62) Division of application No. 18/316,888, filed on May 12, 2023, now Pat. No. 12,075,012, which is a (Continued)

(30) Foreign Application Priority Data

Jun. 25, 2021 (JP) ................................ 2021-105488

(51) Int. Cl.
*H04N 1/00* (2006.01)
*H04N 1/193* (2006.01)

(52) U.S. Cl.
CPC ..... *H04N 1/00543* (2013.01); *H04N 1/00551* (2013.01); *H04N 1/00557* (2013.01); (Continued)

(58) Field of Classification Search
None
See application file for complete search history.

(56) References Cited

U.S. PATENT DOCUMENTS 4,754,337 A 6/1988 Nohtomi et al. ........ H04N 1/04
7,324,781 B2 1/2008 Nose et al. .............. B65H 5/00
(Continued)

FOREIGN PATENT DOCUMENTS

JP H07-301962 A 11/1995
JP 2004-099240 4/2004
(Continued)

OTHER PUBLICATIONS

Extended European Search Report dated Nov. 22, 2022 in counterpart EP Application No. 22176310.5.
(Continued)

*Primary Examiner* — Haris Sabah
(74) *Attorney, Agent, or Firm* — Venable LLP

(57) ABSTRACT

An image reading apparatus for reading image information from a sheet includes a cover unit, a sheet feeding member, a conveying guide, and a reading unit including a transparent member and a reading portion. The cover unit is rotatable between a closed position where the cover unit forms a sheet conveying passage in cooperation with the conveying guide and an open position where the sheet conveying passage is open. In a state in which the cover unit is positioned in the closed position, the transparent member is exposed to an outside of the image reading apparatus by rotation of the conveying guide and the reading unit.

10 Claims, 22 Drawing Sheets

Related U.S. Application Data division of application No. 17/752,646, filed on May 24, 2022, now Pat. No. 11,689,675.

(52) U.S. Cl.
CPC ..... *H04N 1/00559* (2013.01); *H04N 1/00615* (2013.01); *H04N 1/193* (2013.01)

(56) References Cited

U.S. PATENT DOCUMENTS

| | | | | |
|---|---|---|---|---|
| 9,270,837 | B1 | 2/2016 | Whitesell et al. | H04N 1/00 |
| 9,567,180 | B2 | 2/2017 | Murodate | B65H 1/04 |
| 10,298,792 | B2 | 5/2019 | Nakayama | |
| 10,992,832 | B2 * | 4/2021 | Nakayama | H04N 1/00572 |
| 11,388,302 | B2 | 7/2022 | Suzuki et al. | H04N 1/00 |
| 11,689,675 | B2 | 6/2023 | Yamada et al. | H04N 1/00 |
| 2004/0223796 | A1 | 11/2004 | Iwata | G03G 15/00 |
| 2006/0140670 | A1 | 6/2006 | Choi et al. | 399/110 |
| 2006/0158701 | A1 * | 7/2006 | Park | H04N 1/123 358/498 |
| 2006/0243932 | A1 | 11/2006 | Okubo et al. | G03B 42/08 |
| 2008/0157639 | A1 | 7/2008 | Jeong et al. | 312/237 |
| 2008/0158620 | A1 | 7/2008 | Iwata et al. | H04N 1/00 |
| 2008/0239416 | A1 | 10/2008 | Kato et al. | H04N 1/04 |
| 2011/0242622 | A1 * | 10/2011 | Takeuchi | H04N 1/1245 358/498 |
| 2014/0168680 | A1 * | 6/2014 | Shiomi | H04N 1/00551 358/1.13 |
| 2014/0211284 | A1 | 7/2014 | Takeuchi et al. | H04N 1/00 |
| 2014/0320929 | A1 | 10/2014 | Kato et al. | H04N 1/00 |
| 2015/0183601 | A1 | 7/2015 | Suganuma | B65H 5/06 |
| 2016/0255225 | A1 | 9/2016 | Yamamoto et al. | H04N 1/00 |
| 2017/0070626 | A1 | 3/2017 | Ikeda | G03G 15/00 |
| 2019/0208081 | A1 * | 7/2019 | Horiguchi | H04N 1/407 |
| 2020/0010295 | A1 | 1/2020 | Hishinuma | B65H 5/06 |
| 2020/0385226 | A1 | 12/2020 | Hishinuma et al. | B65H 7/14 |
| 2021/0006679 | A1 | 1/2021 | Hasegawa | H04N 1/00 |
| 2022/0182506 | A1 | 6/2022 | Fuji | H04N 1/00 |
| 2022/0417374 | A1 | 12/2022 | Yamada et al. | H04N 1/00 |

FOREIGN PATENT DOCUMENTS

| | | |
|---|---|---|
| JP | 2004-357287 | 12/2004 |
| JP | 2005-194011 | 7/2005 |
| JP | 2007-174497 | 7/2007 |
| JP | 2008-252380 | 10/2008 |
| JP | 2009-118413 | 5/2009 |
| JP | 2009-258360 | 11/2009 |
| JP | 2009-260477 | 11/2009 |
| JP | 2010-130422 | 6/2010 |
| JP | 2016-220232 | 12/2016 |
| KR | 10-2008-0064000 | 7/2008 |

OTHER PUBLICATIONS

Notice of Allowance dated Jun. 26, 2025 in counterpart Chinese Application No. 202210711934.0, together with English translation thereof.
Office Action dated Feb. 28, 2025 in counterpart Chinese Application No. 202210711934.0, together with English translation thereof.
Office Action dated Mar. 4, 2025 in counterpart Japanese Application No. 2021-105488, together with English translation thereof.
Office Action dated May 29, 2025 in counterpart Korean Application No. 10-2022-0075573, together with English translation thereof.
Office Action dated May 26, 2026, in Japanese Patent Application No. 2025-122649.
Search Report dated Jun. 25, 2026, in European Patent Application No. 26163273.1.

* cited by examiner

IMAGE READING APPARATUS AND IMAGE FORMING APPARATUS

CROSS-REFERENCE TO RELATED APPLICATIONS

This application is a divisional of application Ser. No. 18/316,888 filed May 12, 2023, currently pending, which is a divisional of application Ser. No. 17/752,646 filed May 24, 2022, issued as U.S. Pat. No. 11,689,675 on Jun. 27, 2023; and claims priority under 35 U.S.C. § 119 to Japan Application JP 2021-105488 filed in Japan on Jun. 25, 2021; and the contents of all of which are incorporated herein by reference as if set forth here in full.

FIELD OF THE INVENTION AND RELATED ART

The present invention relates to an image reading apparatus for reading image information from a sheet and an image forming apparatus for forming an image on a recording material.

Conventionally, in the image reading apparatus mounted in a copying machine or the like, one in which a reading unit is provided inside an automatic document (original) feeder (ADF) for feeding originals while separating the originals one by one has been known. In the case where the reading unit is provided inside the ADF, in order to clean a glass surface opposing the original and the eliminate (clear) an original jam, a conveying passage is constituted openably so that the glass surface of the reading unit is exposed to an outside of the image reading apparatus in some cases. In Japanese Laid-Open Patent Application (JP-A) 2016-220232, a constitution in which in order to expose the glass surface of the reading unit to the outside of the image reading apparatus, a conveying guide member provided below the conveying passage of the ADF is rotated is disclosed.

However, in the constitution disclosed in JP-A 2016-220232, a use makes access the glass surface of the reading unit from below the ADF. In such a case, there is a need to clean the glass surface in a manner such that the user looks into the reading unit from below the ADF, and therefore, there was a problem that the glass surface is not readily cleaned.

SUMMARY OF THE INVENTION

A principal object of the present invention is to provide an image reading apparatus capable of facilitating cleaning of a glass surface of a reading unit and to provide an image forming apparatus including the image reading apparatus.

According to an aspect of the present invention, there is provided an image reading apparatus for reading image information from a sheet, comprising: a cover unit provided rotatably about a first rotational axis and including an upper surface of the image reading apparatus; a sheet conveying member configured to convey the sheet along a sheet conveying passage; a conveying guide provided rotatably about a second rotational axis different from the first rotational axis and configured to guide the sheet fed by the sheet conveying member; and a reading unit which includes a transparent member and a reading portion configured to read, through the transparent member, an image on the sheet fed by the sheet conveying member and which is provided rotatably about a third rotational axis different from the first rotational axis and the second rotational axis, wherein the cover unit is rotatable between a closed position where the cover unit forms the sheet conveying passage in cooperation with the conveying guide and an open position where the sheet conveying passage is open, and wherein in a state in which the cover unit is positioned in the open position, the transparent member is exposed to an outside of the image reading apparatus by rotation of the conveying guide and the reading unit.

Further features of the present invention will become apparent from the following description of exemplary embodiments with reference to the attached drawings.

DESCRIPTION OF THE EMBODIMENTS

In the following, embodiments according to the present invention will be described with reference to the drawings.

[Image Forming Apparatus]

Figure 1A:
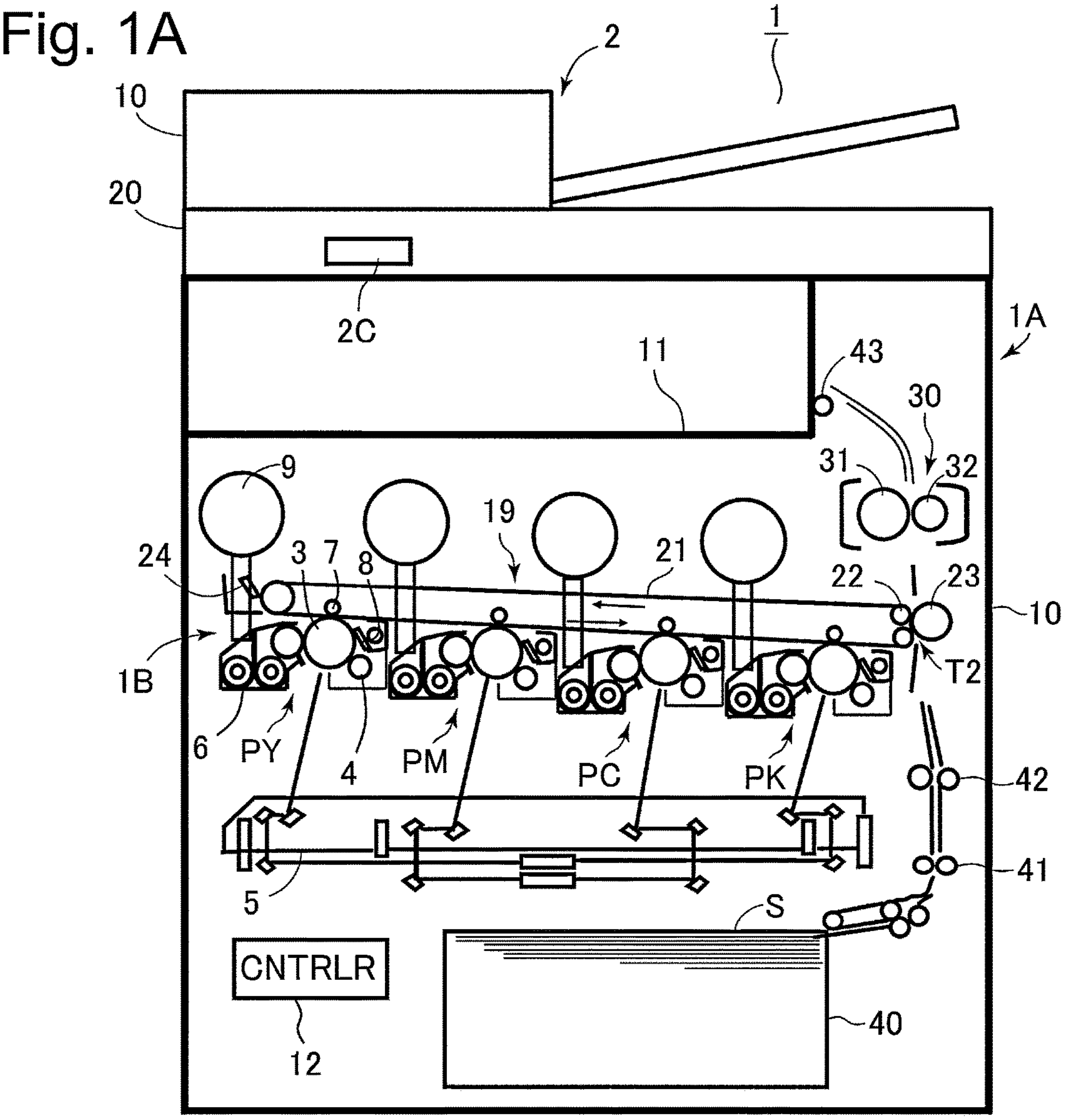
FIG. 1A is a schematic view of an image forming apparatus according to an embodiment.

First, a schematic structure of an image forming apparatus 1 according to an embodiment will be described using FIG. 1A. The image forming apparatus 1 of this embodiment is a color electrophotographic apparatus including, as image forming means, an image forming mechanism 1B including four image forming portions PY, PM, PC and PK. The image forming apparatus 1 forms an image on a sheet S on the basis of image information received from an original reading apparatus 2 provided at an upper portion of an apparatus main assembly 1A or from an external device. As the sheet which is a recording material, it is possible to use a variety of sheet materials different in size and material, including papers such as plain paper and thick paper, a plastic film, a cloth, a surface-treated sheet material such as coated paper, special-shaped sheet materials such as an envelope and index paper, and the like.

The image forming apparatus 1 includes a main controller 12. The main controller 12 includes a CPU as an executing means for executing a control program for the image forming apparatus 1, an ROM for storing a program, an RAM for temporarily storing data, and an input/output circuit for inputting and outputting signals between itself and an outside. The CPU reads the program from the ROM and then executes the program, and provides instructions to respective portions of the image forming apparatus 1 through the input/output circuit, so that the CPU controls an operation of the image forming apparatus 1. For example, the main controller 12 is electrically connected to a controller 2C of the original reading apparatus 2. The main controller 12 receives the image information read from an original by reading units 110 and 210 through the controller 2C and then is capable of performing an image forming operation (copying) for forming, on the sheet S, an image based on the received image information.

The image forming portions PY, PM, PC and PK are units for forming toner images of yellow, magenta, cyan and black, respectively. The image forming portions PY to PK are also called process units or image forming stations. The four image forming portions PY to PK have the substantially same constitution except that colors of toners used for forming the toner images are different from each other. Each of the image forming portions PY to PK includes a photosensitive drum 3 which is a photosensitive member formed in a drum shape, and as process means actable on the photosensitive member and for executing an electrophotographic means, such as charging device 4, a developing device 6, and a drum cleaner 8. Below each of the image forming portions PY to PK, an exposure device 5 as the process means (exposure means) for exposing the associated photosensitive drum 3 to light is provided. Above each of the image forming portions PY to PK, a supply container 9 for supplying a developer to an associated developing device 6 is mounted detachably mountable to the apparatus main assembly 1A.

Above the image forming portions PY to PK, an intermediary transfer unit 19 is provided. The intermediary transfer unit 19 includes an intermediary transfer belt 21 which is an intermediary transfer member constituted by an endless flexible member, and a plurality of rollers for stretching the intermediary transfer belt 21. The plurality of rollers includes an inner secondary transfer roller 22. On an outer periphery side, a secondary transfer roller 23 is provided at a position opposing the inner secondary transfer roller 22 while sandwiching the intermediary transfer belt 21 therebetween. As a nip between the secondary transfer roller 23 and the inner secondary transfer roller 22, a transfer portion (secondary transfer portion T2) where an image is transferred from the intermediary transfer belt 21 onto the sheet S is formed. On an inner peripheral side of the intermediary transfer belt 21, at a position opposing each photosensitive drum 3, a primary transfer roller 7 is provided while sandwiching the intermediary transfer belt 21 therebetween. Further, on the outer peripheral side of the intermediary transfer belt 21, a belt cleaner 24 is provided.

At a lower portion of the apparatus main assembly 1A, a sheet feeding portion for feeding sheets S is provided. The sheet feeding portion includes a cassette 40 provided detachably mountable to the apparatus main assembly 1A and a feeding unit for feeding the sheets S, stacked and accommodated in the cassette 40, while separating the sheets S one by one. On a feeding passage from the sheet feeding portion to the secondary transfer portion T2, a feeding roller pair 41 and a registration roller pair 42 are provided.

On a side downstream of the secondary transfer portion T2 with respect to a sheet feeding direction, a fixing device 30 is provided. The fixing device 30 includes a fixing roller 31 as a heating member, a pressing roller 32 as a pressing member, and an unshown heating means for heating the fixing roller 31. As the heating means, it is possible to use a halogen lamp and a heating unit of an electromagnetic induction type. On a side further downstream of the fixing device 30, a discharging roller 43 as a discharging means for discharging the sheet S, on which the image is formed, to an outside of the apparatus main assembly 1A is provided. At an upper surface portion of the apparatus main assembly 1A, a discharge tray 11 as a stacking portion on which the sheets, on which the images are formed, are to be stacked is provided. This embodiment employs a constitution of a so-called in-body discharge type in which a space in which the sheets S, on which the images are formed, are to be discharged and stacked is formed between the apparatus main assembly 1A and the original reading apparatus 2 with respect to an up-down direction (vertical direction in the case where the image forming apparatus 1 is installed on a horizontal surface).

When the main controller 12 receives image information and an execution instruction of an image forming operation, the main controller 12, execute the image forming operation in a following manner. First, in each of the image forming portions PY to PK, rotation of the photosensitive drum 3 is started, and then the surface of the photosensitive drum 3 is electrically charged uniformly to a predetermined polarity and a predetermined potential by the charging device 4. The surface of the photosensitive drum 3 is irradiated with (exposed to) laser light modulated depending on an image signal (video signal) based on the image information, so that an electrostatic latent image corresponding to a component image of an associated color of yellow, magenta, cyan and black is written (formed) on the photosensitive drum 3. The resultant electrostatic latent images are developed with develops containing toners of the respective colors, so that toner images of yellow, magenta, cyan and black are prepared on the photosensitive drums 3. The toner images carried on the photosensitive drums 3 are primary-transferred from the photosensitive drums 3 onto the intermediary transfer belt 21 by the primary transfer rollers 7. At this time, the toner images of the respective colors are superposed on each other on the intermediary transfer belt 21, so that an image as a full-color image is formed on the intermediary transfer belt 21. A deposited matter such as transfer residual toner remaining on the surface of the photosensitive drum 3 without being transferred onto the intermediary transfer belt 21 is removed by the drum cleaner 8. The image formed on the intermediary transfer belt 21 is conveyed to the secondary transfer portion T2 by rotation of the intermediary transfer belt 21.

In parallel to a toner image forming process in each of the image forming portions PY to PK, one sheet S is fed from the cassette 40 and is conveyed to the registration roller pair 42 through the feeding roller pair 41. The registration roller pair 42 corrects oblique movement of the sheet S, and thereafter conveys the sheet S to the secondary transfer portion T2 so that arrival of the image, carried on the intermediary transfer belt 21, at the secondary transfer portion T2 and arrival of the sheet S at the secondary transfer portion T2 are synchronized with each other. In the secondary transfer portion T2, the image is transferred (secondary-transferred) from the intermediary transfer belt 21 onto the sheet S under application of a bias voltage to the secondary transfer roller 23. A deposited matter such as the toner remaining on the intermediary transfer belt 21 without being transferred on the sheet S is removed by a belt cleaner 24.

The sheet S passed through the secondary transfer portion T2 is conveyed to the fixing device 30. The fixing device 30 heats and presses the image on the sheet S while nipping and feeding the sheet S in a nip (fixing nip) between the fixing roller 31 and the pressing roller 32. By this, the toner is melted and color-mixed and then is fixed, so that the image fixed on the sheet S is obtained. The sheet S passed through the fixing device 30 is discharged by discharging roller 43, so that the sheet S is stacked on a discharge tray 11. By this, a series of image forming operations is ended.

Incidentally, in this embodiment, the color electrophotographic apparatus of the intermediary transfer type was described as an example, but the image forming apparatus 1 may include an image forming means of a direct transfer type in which a toner image formed on an image bearing member is transferred onto the sheet S without through the intermediary transfer member. Further, an image forming type is not limited to the electrophotographic type, and the image forming apparatus 1 may also include, as the image forming means, a printing unit of an ink jet type or an offset printing mechanism.

[Original Reading Apparatus]

The original reading apparatus 2 which is an example of the image reading apparatus will be described using FIG. 1B. The original reading apparatus 2 includes a scanner portion (main body portion, lower portion unit) 20 and an ADF 10 provided on an upper portion of the scanner portion 20 and used as an upper unit supported rotatably by the scanner portion 20. The original reading apparatus 2 is capable of executing an operation for reading image information from a static original placed on an original supporting platen glass of the scanner portion 20 (fixed reading operation) and an operation for reading the image information while feeding a sheet as an original by the ADF 10 (moving (skimming-through) reading operation).

The scanner portion 20 includes the original supporting platen glass on which the original is to be placed and a reading unit 210 for reading the image information of the original placed on the original supporting platen glass while moving below the original supporting platen glass in a sub-scan direction (left-right direction) in FIG. 1B. Further, the scanner portion 20 includes a glass 201 as a transparent member. The reading unit 210 is capable of reading the image information by optically scanning the original, fed by the ADF 10, through the glass 201.

The reading unit 210 includes a sensor substrate 213 on which a CCD image sensor as a light receiving element is mounted, an illumination portion 211 for illuminating the original with light, and a reduction optical system including a plurality of mirrors 212 and for imaging reflected light from the original onto an imaging surface of the light receiving element. In this embodiment, the reading unit 210 of a CCD type is shown, but a reading unit 210 of a CIS type in which the reflected light from the original is imaged on an imaging surface of a CMOS sensor, provided opposed to the original, through a 1:1 magnification optical system. The image information read by the reading unit 210 is transmitted to a controller 2C through a signal line 151.

The ADF 10 includes an original tray 121, a discharge tray 122, an ADF main body 10A in which an original conveying passage P1 is formed, and a reading unit 110 provided along the original conveying passage P1. In the ADF main body 10A, as a sheet feeding (conveying) member for feeding (conveying) the sheet, a feeding roller 101, a separation roller pair 102, conveying roller pairs 103, 104 and 105, and a discharging roller pair 106 are provided along the original conveying passage P1. The original tray 121 is a stacking portion on which sheets are to be stacked, and the discharge tray 122 is a discharge portion where the sheet from which the image information is read is discharged. The original tray 121 is positioned above the discharge tray 122, and as viewed from a point of view of FIG. 1B (in a state viewed in a sheet widthwise direction), the original conveying passage P1 is curved in a U-shaped which open toward one side of the horizontal direction.

Figure 3:
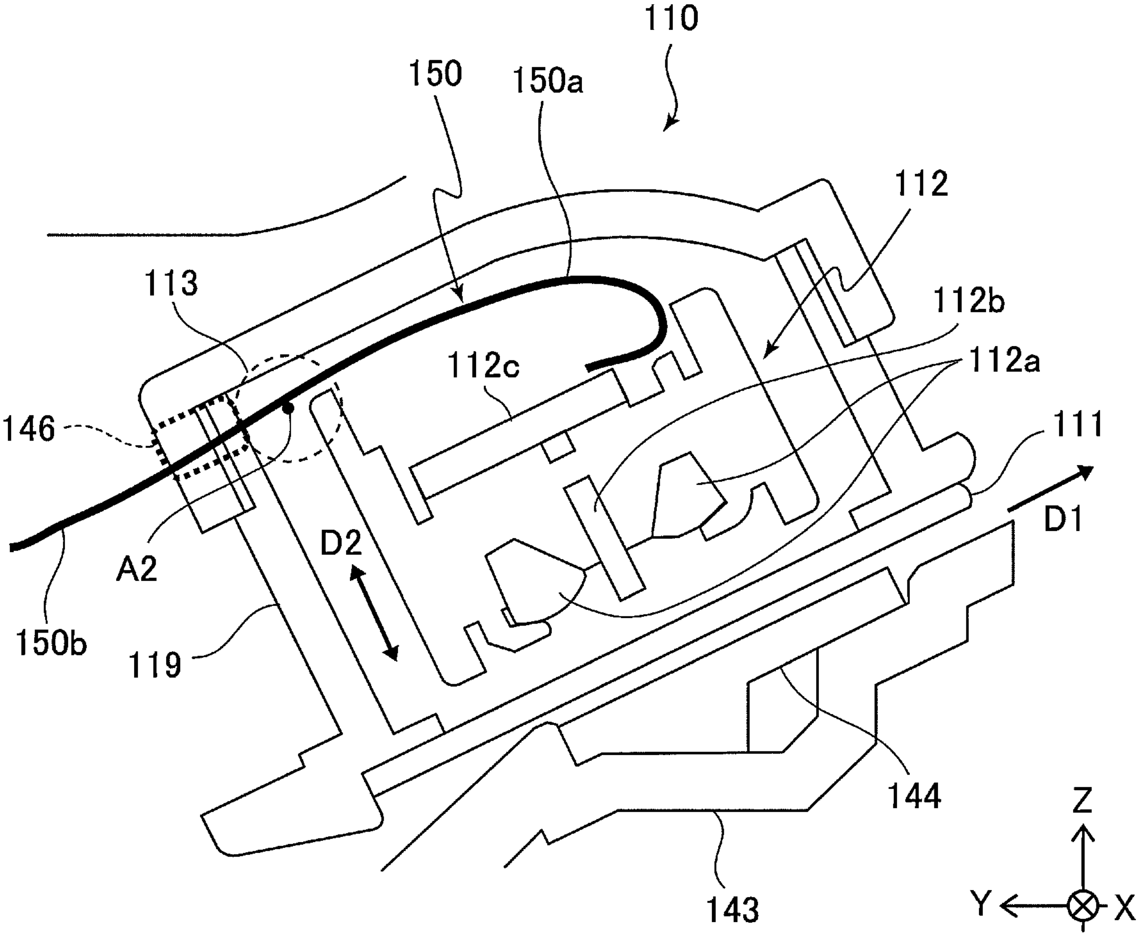
FIG. 3 is a sectional view of a reading unit according to the embodiment 1 and a periphery of the reading unit.

The reading unit 110 includes a contact image sensor (CIS) 112 as a reading portion, a reading frame 119 for holding the CIS 112, and a glass 111 (see also FIG. 3). The glass 111 is a transparent member opposing the original conveying passage (sheet conveying passage) P1, and the CIS 112 functions as a reading portion for reading the image information from the original (sheet), conveyed along the original conveying passage P1, through the transparent member.

The reading frame 119 and the glass 111 form a substantially rectangular parallelopiped-shaped space for accommodating the CIS 112. The CIS 112 includes a sensor substrate 112*c* on which a CMOS image sensor as a light receiving element is mounted, an illumination portion for illuminating the original with light, and a lens 112*b* for constituting a 1:1 optical system for imaging the reflected light, from the original, on an imaging surface of the light receiving element (see also FIG. 3). In this embodiment, the reading unit 110 of a CIS type is shown, but an image sensor unit of a CCD type may be used as the reading unit 110. The image information read by the reading unit is transmitted to the controller 2C through an electric wire 150. A wiring path of the electric wire 150 will be specifically described.

An original feeding (conveying) operation by the ADF 10 will be described using FIG. 1B. When a user sets an original bundle on the original tray 121 and provides a start instruction of a reading operation through an unshown operating portion, the sheets are fed from the original tray 121 by the feeding roller 101 in an order from an uppermost original. The fed sheet is conveyed in a state in which the sheets are separated one by one by the separation roller pair 102 and then conveyed along the original conveying passage P1 while successively delivered by the conveying roller pairs 103, 104 and 105.

Then, when the original passes through the glass 201 of the scanner portion 20, image information of a first side of the original is read by the reading unit 210. Similarly, when the original passes through the glass 111, image information of a second side opposite from the first side of the original is read by the CIS 112 of the reading unit 110. The original from which the pieces of image information are read is discharged to an outside of the ADF main body 10A by the discharging roller pair 106 and then is stacked on the discharge tray 122.

In the following description and drawing, the vertical direction in a state in which the image forming apparatus 1 is installed on the horizontal surface is referred to as a "Z-direction". A sheet widthwise direction perpendicular to the original feeding direction of the original fed along the original conveying passage P1 is referred to as an "X-direction". The X-direction is a main scan direction during image reading and may preferably be a direction (horizontal direction) perpendicular to the Z-direction. The horizontal direction as viewed in the X-direction is referred to as a "Y-direction". The X-direction, the Y-direction, and the Z-direction are directions crossing each other and may preferably be directions perpendicular to each other.

Figure 1B:
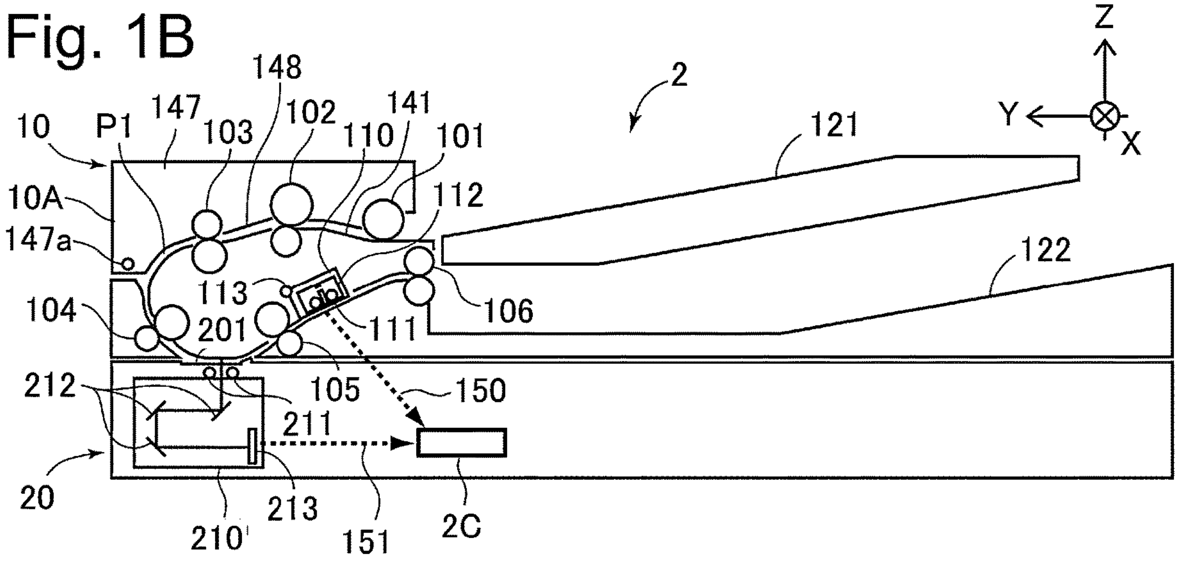
FIG. 1B is a schematic view of an original reading apparatus in the embodiment.
Figure 1C:
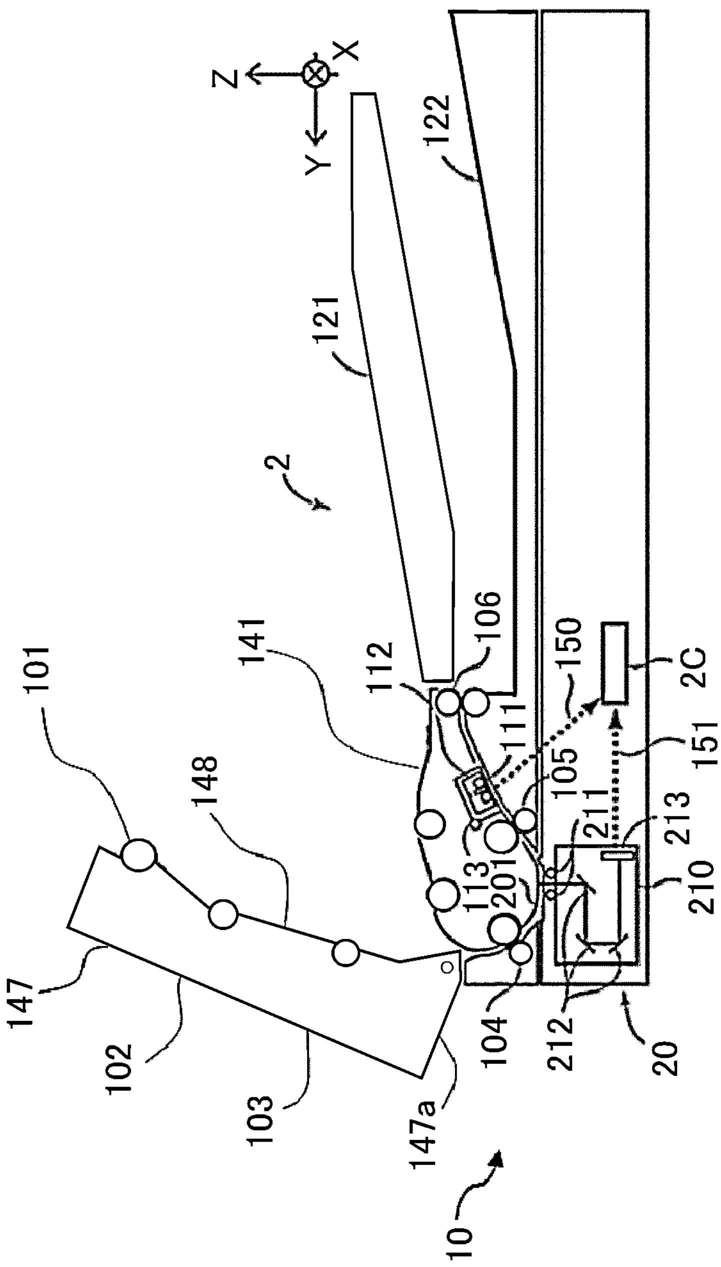
FIG. 1C is a schematic view of the original reading apparatus in a state in which an upper cover is open.

Incidentally, as shown in FIG. 1B, the ADF 10 includes an upper portion cover 147 as a cover unit constituting an upper surface portion of the ADF main body 10A. The upper portion cover 147 is rotatably supported by a frame of the ADF main body 10A through a supporting portion 147*a*, and is rotatable about an axis (first rotational axis) extending in the X-direction. The upper portion cover 147 is provided with a conveying guide 148 as an opposing guide (upper-side guiding surface) forming the original conveying passage P1 between itself and a guiding surface (lower-side guiding surface) of a rotation guide 141 supported by the ADF main body 10A. As shown in FIG. 1B, in a state in which the upper portion cover 147 is closed, a state in which a part of the rotation guide 141 is covered with the upper portion cover 147 is formed. Here, in the state in which the upper portion cover 147 is closed, entirety of the rotation guide 141 may also be covered with the upper portion cover 147. Further, the upper portion cover 147 is provided with the feeding roller 101, one (upper-side roller in the figure) of the separation roller pair 102, and one (upper-side roller in the figure) of the conveying roller pair 103. Accordingly, when the upper portion cover 147 is rotated from a closed position shown in FIG. 1B to an open position shown in FIG. 1C, a part of the original conveying passage P1 is opened, so that the rotation guide 141 is exposed to an outside of the ADF 10, and thus a state in which the rotation guide 141 is capable of being rotated as described later.

[Glass Cleaning]

Incidentally, during repetition of the moving reading operation of the original reading apparatus 2, foreign matters including dust such as paper powder, and contaminants such as paste (adhesive) and ink which have been deposited on the original are deposited on the glasses 201 and 111 in some cases. When the moving reading operation is performed in a state in which the foreign matters are deposited on the glasses 201 and 111 within reading ranges of the reading units 210 and 110, stripe images which do not originally exist on the original are read at positions corresponding to the foreign matters. This phenomenon is caused by a shadow created by blocking an optical path, during reading by the reading units 210 and 110, with the foreign matters deposited on the glasses 201 and 111 (hereinafter, this phenomenon is referred to as an "image stripe(s)").

In order to eliminate an occurrence of the image stripe, removal of the foreign matters, causing the occurrence of the image stripe, through appropriate cleaning of the glasses 201 and 111 is effective. As regards the reading unit 210 of the scanner portion 20, the glass 201 of the reading unit 210 is exposed by rotating the ADF 10 upward, and therefore, the glass 201 can be cleaned from above. On the other hand, the reading unit 110 of the ADF 10 is disposed inside the ADF main body 10A. As shown in FIG. 1B, in this embodiment, the reading unit 110 is disposed in an inside region of the original conveying passage P1 formed below the rotation guide 141 and curved in a U-shape. For that reason, a constitution for exposing the glass 111 to the outside (means for enabling access to the glass 111) is needed.

Here, as a method of exposing the glass 111 of the reading unit 110 to the outside, a constitution in which the reading unit 110 is supported by the rotation guide 141 and is rotated integrally with the rotation guide 141 would be considered. However, in such a constitution, the reading unit 110 is rotated integrally with the rotation guide 141, and therefore, when the rotation guide abuts against another member, impact depending on an entire weight of a rotatable unit including the reading unit 110 and the rotation guide 141 generates. The reading unit 110 is a precise device in which an electronic circuit including a light receiving element, and optical elements constituting an illumination portion and a 1:1 optical system or a reduction optical system are provided. For that reason, in the case where the rotation guide 141 is rotated for exposing the glass 111 to the outside, when large impact is exerted on the reading unit 110, there is a possibility that inside component parts are broken or displaced.

Therefore, as described in the following, in this embodiment, a constitution in which not only the rotation guide 141 as a rotatable conveying guide is provided but also the reading unit 110 is made rotatable, independently of the rotation guide 141, about a rotational axis different from the rotational axis of the rotation guide 141 is employed. By rotating the rotation guide 141 and the reading unit 110, the glass 111 which is a surface opposing a sheet (object to be read) of the reading unit 110 is exposed to the outside. By this, the impact exerted on the reading unit 110 when the reading unit 110 is moved for performing the cleaning of the glass 111 or jam clearance can be reduced. Further, by employing a constitution in which the reading unit 110 is made rotatable independently of the rotation guide 141, stress exerted on the electric wire connecting the reading unit 110 and the controller 2C to each other can also be reduced.

In the following, specific constitutions of the reading unit 110 and a periphery thereof will be described while citing embodiments.

Embodiment 1

Figure 2:
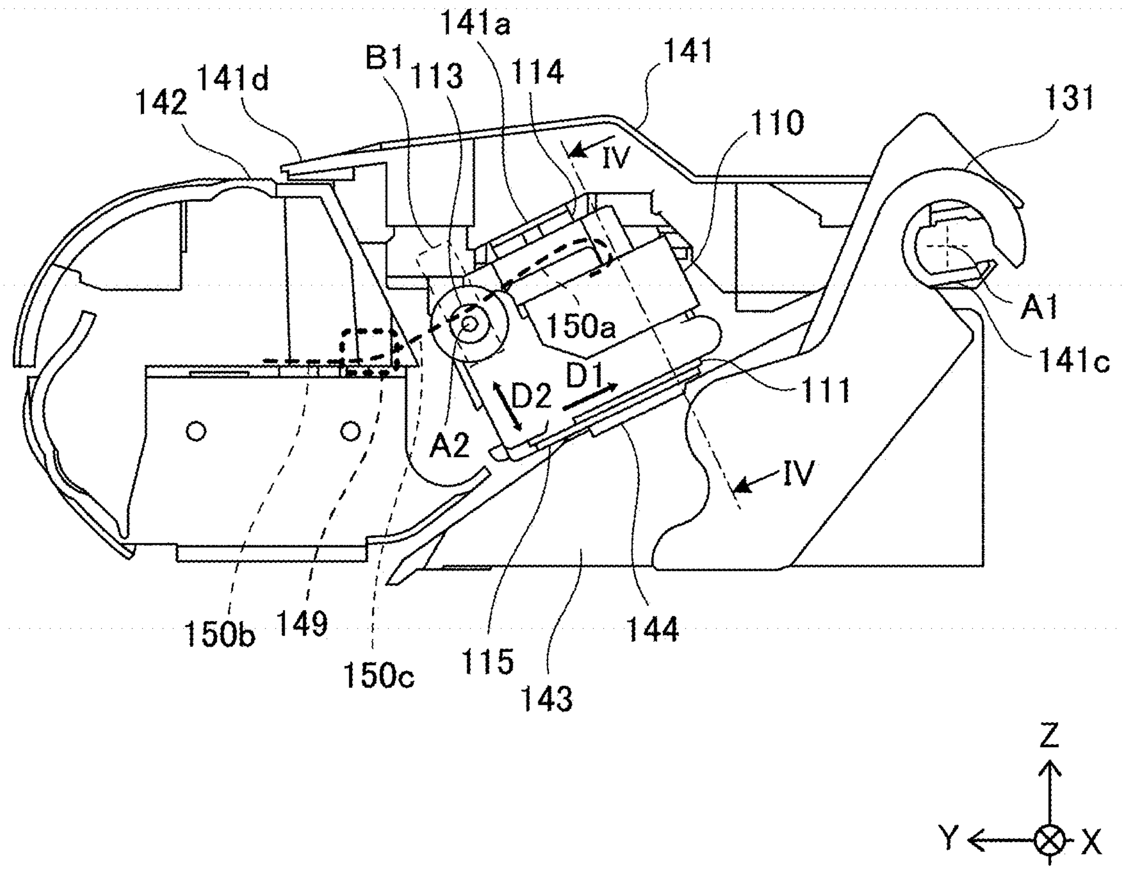
FIG. 2 is a schematic view showing a part of an ADF according to an embodiment 1.

First, an embodiment 1 will be described using FIGS. 2 to 7. FIG. 2 is a side view showing a part of components of the ADF 10. In this embodiment, in the case where the ADF 10 is viewed in the X-direction from a front surface side of the image forming apparatus 1, members positioned inside the original conveying passage P1, and a base conveying guide 143 and an arm 131 are shown in FIG. 2. FIG. 3 is a sectional view of the reading unit 110 cut along a plane perpendicular to the X-direction.

As shown in FIGS. 2 and 3, to a bottom (opening of the reading frame 119 having a substantially U-shape in cross section) of the reading unit 110 in which the CIS 112 is incorporated, the glass 111 is stuck. Further, to each of opposite end portions of the glass 111 with respect to the X-direction (longitudinal direction of the CIS 112, main scan direction), a gap sheet 115 is stuck.

Figure 4:
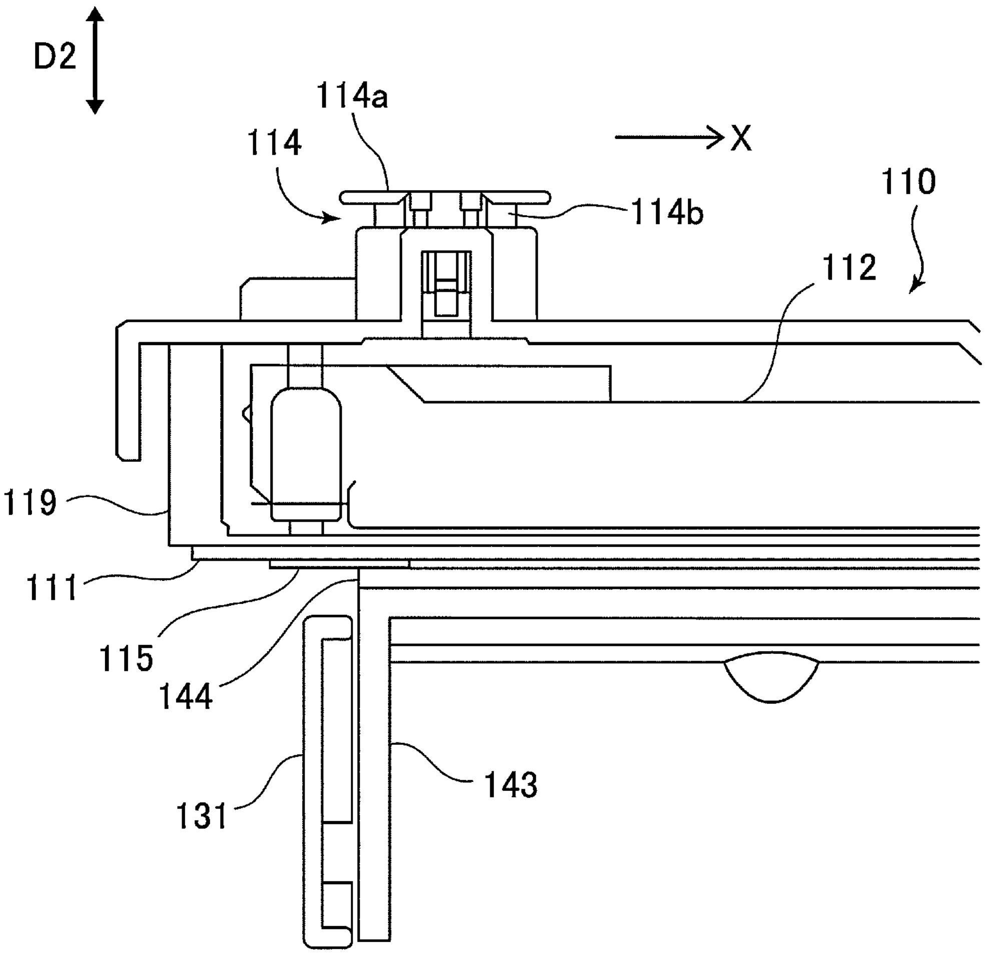
FIG. 4 is a sectional view of the reading unit in a cutting position shown in FIG. 2 and a periphery of the reading unit.

FIG. 4 shows a state of an IV-IV cross section of FIG. 2. Incidentally, the IV-IV cross section is a cross section obtained by cutting the reading unit 110 along a plane (plane extending in the X-direction and a sheet thickness direction D2 at a scanning position) perpendicular to a sheet feeding direction D1 at the scanning position of the reading unit 110. As shown in FIG. 2 and FIG. 4, each of the two gap sheets 115 stuck to (mounted on) the opposite end portions of the glass 111 with respect to the X-direction abuts against a shading plate 144 which is an opposing member opposing the glass 111. As a result, in a region (original passing region) between the gap sheets 115 with respect to the X-direction, as shown in FIG. 3, a gap corresponding to a thickness of the gap sheets 115 is ensured between the glass 111 and the shading plate 144. That is, the gap sheets 115 function as a gap forming member for forming a gap between the glass 111 and the opposing member in contact with the opposing member opposing the glass 111. The gap forming member is not limited to the gap sheets 115 when the member ensures (defines) a width (range) of the gap, and for example, a projection projecting toward the glass 111 may be formed integrally with the reading frame 119.

Incidentally, the shading plate 144 is mounted on the base conveying guide 143 which is a conveying guide opposing the reading unit 110, and the base conveying guide 143 is mounted on the frame of the ADF 10. That is, the shading plate 144 and the base conveying guide 143 are members fixed to the frame of the ADF 10.

Further, a pressing portion 114 for pressing the reading unit 110 is provided so stat the reading unit 110 is stably at rest at abutment positions of the glass sheets 115 (FIG. 4).

The pressing portion 114 is provided at an upper portion (on a side opposite from the glass 111) of the reading unit 110. The pressing portion 114 includes a resin cover 114*a* as a contacted portion contacted to a pressing surface 141*a* (FIG. 2) provided on the bottom of the rotation guide 141, and a compression spring 114*b* as an elastic member interposed between the resin cover 114*a* and the reading frame 119.

The rotation guide 141 includes a shaft portion 141*c* rotatably supported by the frame of the ADF 10 and is rotatable about a rotational axis A1 (second rotational axis). In this embodiment, the rotational axis A1 is provided at an upstream end (one-side end portion with respect to the Y-direction) of the rotation guide 141 with respect to the sheet feeding direction of the sheet fed from the feeding roller 101 toward the separation roller pair 102, but may also be provided at another position. Further, a supporting portion is not limited to the shaft portion 141*c* when the supporting portion is a supporting portion for rotatably supporting the rotation guide 141, and the rotation guide 141 may be provided with a hole (bearing portion) in which a shaft-shaped portion provided on the frame of the ADF 10 is engageable. The rotation guide 141 is rotatable between a position for guiding a lower surface of the original fed along the original conveying passage P1 (see FIG. 2, hereinafter, this position is referred to as a closed position) and a position moved upward from the closed position (see FIG. 6, hereinafter, this position is referred to as an open position). The closed position is a position (third position) where the rotation guide 141 covers the reading unit 110 as viewed from above, and the open position is a position (fourth position) where the rotation guide 141 exposes the reading unit 110 to the outside as viewed from above. The rotation guide 141 is held at the closed position by engaging a fixing portion 141*d*, provided at a free end portion thereof, with a conveying guide 142 fixed to the ADF main body 10B.

In a state in which the rotation guide 141 is positioned at the closed position, the pressing surface 141*a* of the rotation guide 141 contacts the resin cover 114*a* of the pressing portion 114. Then, by elasticity of the compression spring 114*b* generated by pressing of the resin cover 114*a*, the reading unit 110 is pressed toward the shading plate 144. By this, a position of the reading unit 110 with respect to the sheet thickness direction D2 is stabilized, so that this contributes to reading of the image information with high accuracy.

The reading unit 110 includes a shaft portion 113 rotatably supported by the frame of the ADF 10, and is rotatable about another rotational axis A2 (third rotational axis) different from the rotational axis A1 of the rotation guide 141. Incidentally, the supporting portion is not limited to the shaft portion 113 when the supporting portion is capable of supporting the reading unit 110, and the read frame 119 may be provided with a hole (bearing portion) with which a shaft-shaped portion provided to the frame of the ADF 10 is engageable. The reading unit 110 is rotatable between a position where the image information is readable from the original fed along the original conveying passage P1 (see FIG. 2, hereinafter, this position is referred to as a reading position) and a position where the glass 111 is exposed to the outside (see FIG. 6, hereinafter, this position is referred to as a maintenance position). The reading position is a position (first position) of the reading unit 110 where the glass 111 which is a transparent member is in a state opposing the original conveying passage P1, and the maintenance position is a position (second position) of the reading unit 110 where the glass 111 is in an exposed state as viewed from the outside of the ADF 10.

In a state in which the reading unit 110 is positioned at the reading position, the glass 111 opposes the shading plate 144 or the base conveying guide 143 through the original conveying passage P1 and is hidden behind the reading frame 119 as viewed from above with respect to the vertical direction. The maintenance position is a position of the reading unit 110 where at least a part (preferably a range encompassing a reading range of the CIS 112 or entirety of the glass 111) of the glass 111 is exposed to the outside when the ADF 10 is viewed in a predetermined direction (for example, from above with respect to the vertical direction).

The shaft portion 113 is provided so as to project from opposite end portions of the reading frame 119 toward the outside in the X-direction (longitudinal direction), and is held by a holding portion B1 provided. Accordingly, the rotational axis A1 of the rotation guide 141 and the rotational axis of the reading unit 110 is substantially parallel to each other and substantially extend in the X-direction. The holding portion B1 is a recessed portion (opening) rotatably holding the shaft portion 113, and the holding portion B1 in this embodiment is an elongated circular hole (groove portion) extending in the sheet thickness direction D2. The holding portion B1 as the elongated circular hole is, for example, provided on a side plate (plate-like member extending in the Y-direction and the Z-direction on a side out of an original passing region with respect to the X-direction) constituting the frame of the ADF 10.

The rotational axis A1 of the rotation guide 141 is provided at an end portion of the rotation guide 141 on one end side (right-hand side of FIG. 2) with respect to the Y-direction, and on the other hand, the shaft portion 113 in this embodiment is provided at an end portion of the reading unit 110 on the other end side (left-hand side of FIG. 2) with respect to the Y-direction and on an upper side with respect to the Z-direction. For this reason, the reading unit 110 is rotated counterclockwise (in a first rotational direction) in FIG. 2 from the reading position toward the maintenance position, and on the other hand, the rotation guide 141 is rotated clockwise (in a second rotational direction) in FIG. 2 from the closed position toward the open position. Thus, when a constitution in which the rotational direction of the rotation guide 141 and the rotational direction of the reading unit 110 are opposite to each other is employed, there is also an advantage such that a rotation range of the reading unit 110 is easily ensured without being influenced by the rotation guide 141 in the open position. Incidentally, the rotational direction of the rotation guide 141 during the open thereof is opposite to a rotational direction of the upper portion cover 147.

Next, the arm 131 will be described. The arm 131 is a member which is rotatably supported by the frame of the ADF 10 and which moves the reading unit 110 from the reading position to the maintenance position by being rotated in interrelation with rotation of the rotation guide 141 from the closed position to the open position. That is, the arm 131 is an example of an interrelating mechanism for moving the reading unit 110 in interrelation with the rotation of the rotation guide 141. The arm 131 in this embodiment is a member which is rotated about the rotational axis A1 common to the arm 131 and the rotation guide 141 and which is rotatable independently of the rotation guide 141.

Figure 5A:
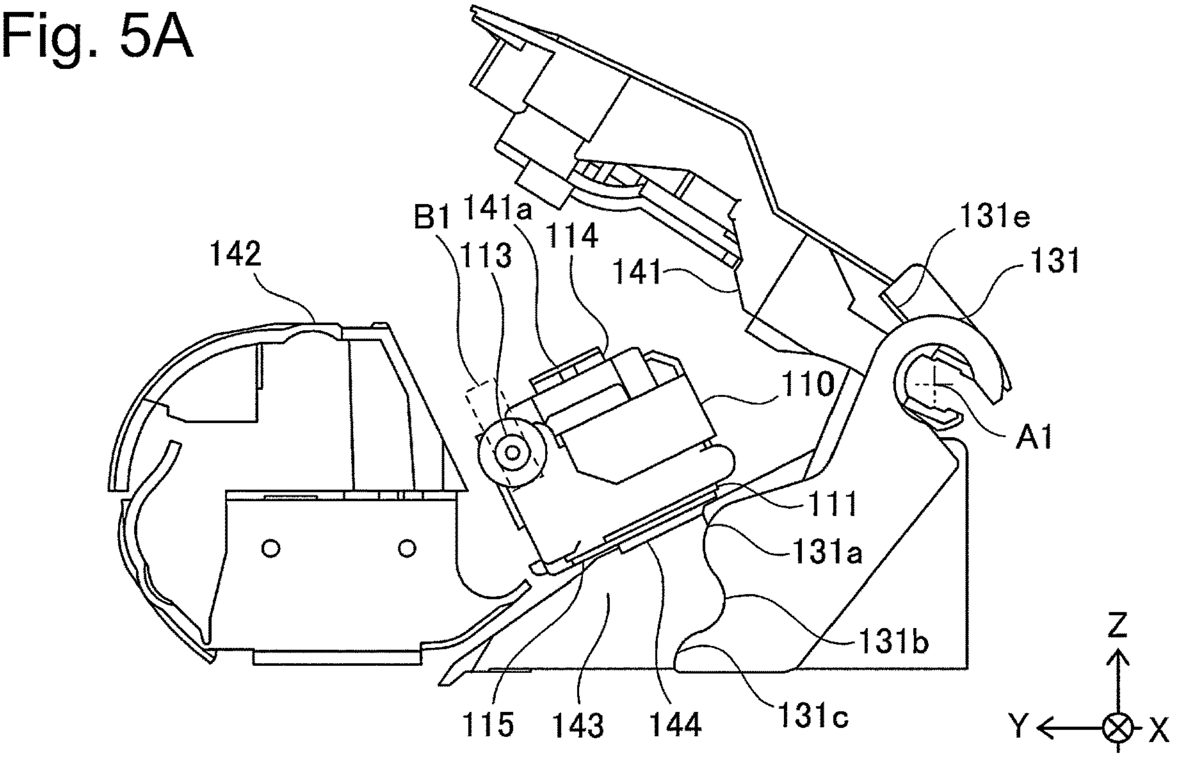
FIG. 5A and FIG. 5B are schematic views for illustrating movement of a rotation guide and the reading unit in the embodiment 1.
Figure 5B:
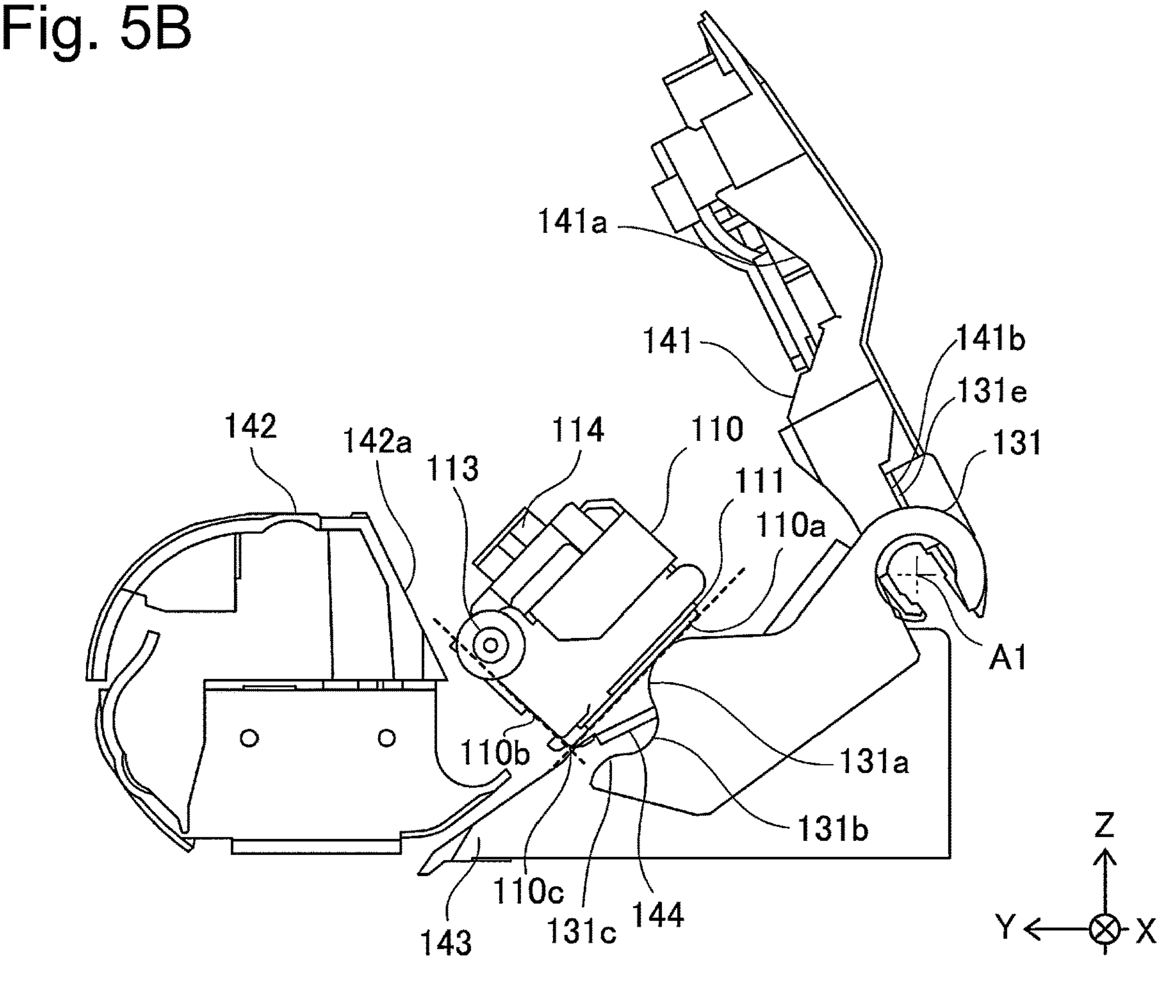

As shown in FIG. 5A and FIG. 5B, the rotation guide 141 is provided with an arm contact portion 141*b*, and the arm 131 is provided with a contacted portion 131*e* to which the arm contact portion 141*b* is contactable. In a state in which the rotation guide 141 is positioned in the closed position and the reading unit 110 is positioned in the reading position, the arm contact portion 141*b* is spaced from the contacted portion 131*e*. Further, on a free end side of the arm 131, arc profiles 131*a*, 131*b* and 131*c* as contact portions for urging (pressing) the reading unit 110. Details of the arc profiles 131*a*, 131*b* and 131*c* will be described later.

In this embodiment, a constitution in which the arm 131 is interrelated with the rotation guide 141 only within an integral range and in which a rotation range of the arm 131 is narrower than a rotation range of the rotation guide 141 is employed. Specifically, at the closed position of the rotation guide 141, the arm contact portion 141*b* of the rotation guide 141 does not contact the arm 131, and at an intermediary position during rotation of the rotation guide 141 toward the open position, the arm contact portion 141*b* contacts the arm 131 (FIG. 5A, FIG. 5B). For this reason, compared with the case where the arm 131 is rotated integrally with the rotation guide 141, a rotation locus of the arm 131 becomes small, so that a space required for disposing the arm 131 therein can be made small.

An operation in which the reading unit 110 is moved from the reading position to the maintenance position when a maintenance operation is performed will be described. Incidentally, an operator (user or maintenance person) opens the upper portion cover 147 in advance by rotating the upper portion cover 147 upward from the closed position shown in FIG. 1B.

First, in the state shown in FIG. 2, in order to ensure a rotation space of the reading unit 110, the operator holds the rotation guide 141 and then rotates the rotation guide 141 about the rotational axis A1 in the clockwise direction in FIG. 2. Thus, as shown in FIG. 5A, not only the rotation guide 141 is spaced upward from the reading unit 110 but also the arm contact portion 141*b* approaches the contacted portion 131*e* of the arm 131.

When the rotation guide 141 is further rotated, as shown in FIG. 5B, the arm contact portion 141*b* contacts the contacted portion 131*e* of the arm 131, so that the arm 131 is rotated about the rotational axis 1A in the clockwise direction in FIG. 5B. By the rotation of the arm 131, the arc profiles 131*a* and 131*c* provided on the free end side of the arm 131 contact and urge (press) the reading unit 110, and thus rotate the reading unit 110 about the shaft portion 113 in the counterclockwise direction in FIG. 5B.

Figure 6:
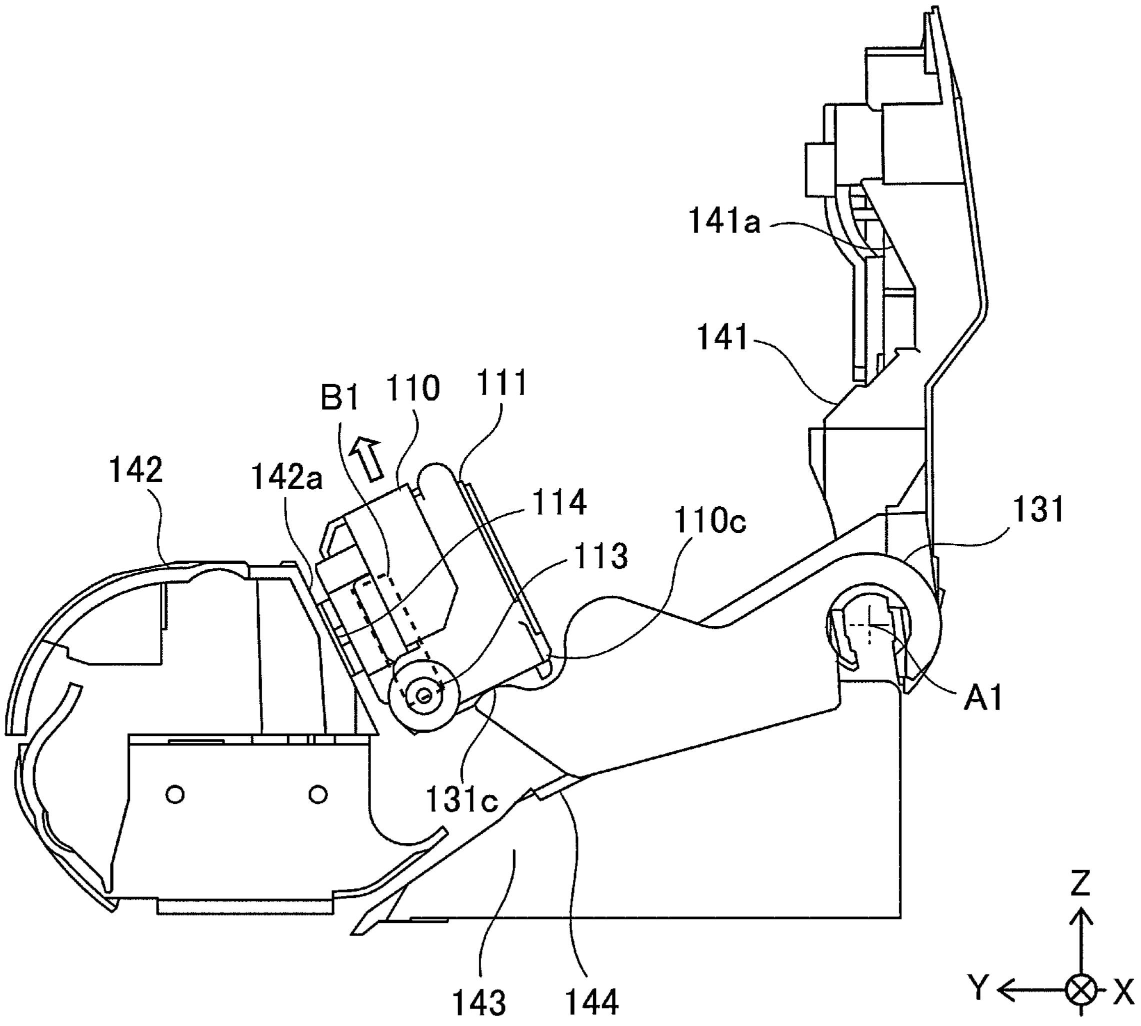
FIG. 6 is a schematic view showing a state in which the reading unit in the embodiment 1 is moved to a maintenance position.

By this, the reading unit 110 is moved from the reading position shown in FIG. 2 to the maintenance position shown in FIG. 6.

The operator is capable of easily performing an operation such as cleaning of the glass 111 or the like for the reading unit 110 moved to the maintenance position. The rotation guide 141 can be constituted so that the reading unit 110 is held at the maintenance position through the arm 131 by being retained at the open position, for example, by a self-weight thereof. Incidentally, as described later specifically, when the reading unit 110 reaches the maintenance position, the pressing portion 114 of the reading unit 110 abuts against an abutment surface 142*a* (FIG. 6) of the conveying guide 142 fixed to the frame of the ADF main body 10A.

When the operation such as the cleaning of the glass 111 or the like is ended, in the state of FIG. 6, the operator rotates the rotation guide 141 in the counterclockwise direction in FIG. 6 from the open position toward the closed position. Then, the arm 131 is rotated in the counterclockwise direction in FIG. 6 with the rotation of the rotation guide 141. Further, the reading unit 110 is rotated in the clockwise direction in FIG. 6 from the maintenance position toward the reading position while being supported by the arm 131. Then, when the rotational guide 141 reaches the closed position, the reading unit 110 is returned to the state of FIG. 2 in which the reading unit 110 is held at the reading position. That is, in this embodiment, the reading unit 110 is moved from the reading position to the maintenance position in interrelation with the opening operation of the rotation guide 141, and is moved from the maintenance position to the reading position in interrelation with the closing operation of the rotation guide 141.

Thus, the reading unit 110 is constituted so as to be rotatable about the rotational axis different from the rotational axis of the rotation guide 141, so that when the reading unit 110 is moved for performing the cleaning of the glass 111 or the jam clearance, the impact exerted on the reading unit 110 can be reduced.

Further, in this embodiment, the holding portion B1 on a mating side (frame side of the ADF 10) to the shaft portion 113 of the reading unit 110 is constituted as the elongated circular hole extending in the sheet thickness direction. In order to make the reading unit 110 rotatable separately from the rotation guide 141, the holding portion B1 may also be constituted as a cylindrical hole corresponding to the shaft portion 113. However, in this embodiment, the holding portion B1 is constituted as the elongated circular hole, so that in addition to rotation of the reading unit 110, movement of the reading unit 110 in the sheet thickness direction D2 is allowed. By this, while regulating a positional deviation of the reading unit 110 in the sheet feeding direction D1, a variation in position of the reading unit 110 due to a part tolerance or the like of the ADF 10 can be absorbed by movement of the shaft portion 113. The variation in position of the reading unit 110 is absorbed, so that the glass 111 can be more stably positioned relative to the shading plate 144 through the gap sheet 115.

Further, as indicated by an arrow in FIG. 6, in a state in which the reading unit 110 is rotated to the maintenance position, corresponding to a length of the holding portion B1, the reading unit 110 can be raised, and therefore, an operation property such as a maintenance property can be improved. At this time, when the abutment surface 142*a* of the conveying guide 142 is constituted as an inclined surface with inclination along the holding portion B1, the abutment surface 142*a* also functions as a guide when the reading unit 110 is raised. Incidentally, in this embodiment, a constitution in which the longitudinal direction of the elongated circular hole which is the holding portion B1 substantially coincides with the sheet thickness direction D2 of the reading unit 110 at the reading position was employed. The holding portion B1 is not limited thereto, but may also be an elongated circular hole extending in a direction, different from the sheet thickness direction D2, within directions crossing the sheet feeding direction D1 as viewed in the X-direction.

[Wiring to Reading Unit]

Next, a wiring path to the reading unit 110 and an advantage thereof in this embodiment will be described.

As described above, the reading unit 110 is electrically connected to the controller 2C (FIG. 1B) of the original reading apparatus 2 through the electric wire 150. The electric wire 150 is not only a signal line for transmitting, to the controller 2C, the image information read by the reading unit 110 but also an electric power line for supplying electric power to the reading unit 110. In this embodiment, as the electric wire 150, a flexible flat cable (FFC) is used.

As shown in FIGS. 2 and 3, the electric wire 150 is connected to the sensor substrate 112*c* inside the reading unit 110 and is led out to the outside of the reading unit 110 through an opening (outlet 146) provided in the reading frame 119. On the outside side of the reading unit 110, the electric wire 150 is wired inside the ADF main body 10A while being guided by a guiding member mounted on the frame of the ADF 10 and is connected to the controller 2C of the scanner portion 20. Accordingly, the electric wire 150 includes an inner unit portion 150*a* held in the reading unit 110, a main body-side portion 150*b* held by the frame of the ADF main body 10A, and an intermediary portion 150C connecting the inner unit portion 150*a* and the main body-side portion 150*b*. The intermediary portion 150*c* is a portion between the outlet 146 of the reading unit 110 and an inlet 149 (opening for receiving the electric wire 150 or guiding member for holding the electric wire 150) on the ADF main body 10A. Incidentally, in order to facilitate flexure of the intermediary portion 150*c*, the electric wire (FFC) 150 is disposed so that a widthwise direction of the electric wire 150 in the intermediary portion 150*c* is substantially parallel to the X-direction which is a main scan direction of the reading unit 110.

Figure 17A:
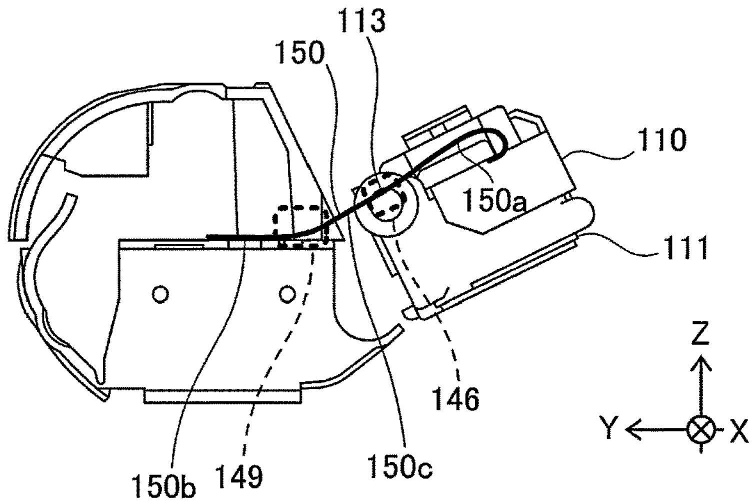
FIG. 17A, FIG. 17B and FIG. 17C are schematic views each showing an electric wire connected to the reading unit in the embodiment 1.

When the reading unit 110 which is a movable member relative to the frame of the ADF main body 10A is moved, the electric wire 150 is flexed, so that movement of the reading unit 110 is allowed. That is, when the reading unit 110 is rotated from a reading position shown in FIG. 17A to a maintenance position shown in FIG. 17B, principally the intermediary portion 150*c* of the electric wire 150 is flexed by following a change in attitude of the reading unit 110, so that the rotation of the reading unit 110 is allowed. Further, as shown in FIG. 17C<when the reading unit 110 positioned in the maintenance position is raised along the holding portion B1, the intermediary portion 150*c* of the electric wire 150 extends (by which flexure due to an excessive length is eliminated), so that upward movement of the reading unit 110 is allowed.

Here, in this embodiment, by employing a constitution in which the reading unit 110 is rotatable separately form the rotation guide 141, stress exerted on the electric wire 150 when the reading unit 110 is rotated can be reduced. This will be described below.

As shown in FIG. 3, the electric wire 150 is led out from an inside to an outside the reading unit 110 through the neighborhood of the rotational axis A2 of the reading unit 110. As viewed in the X-direction, a distance from the reading unit 110 to the outlet 146 through which the electric wire 150 is led out is shorter than at least a distance from the rotational axis A1 (second rotational axis) of the rotation guide to the outlet 146. For that reason, compared with the case where the reading unit 110 is mounted on the rotation guide 141, a movement amount of the outlet 146 when the reading unit 110 is rotated becomes small. Further, the neighborhood of the rotational axis A2 may preferably refers specifically to the case where the electric wire 150 passes through a position of the rotational axis A2 overlaps with the shaft portion 113 in a state in which these portions are viewed in the X-direction. Further, an arrangement such that of four corner portions of the reading frame 119 having a substantially rectangular shape as viewed in the X-direction, one corner portion closest to the outlet 146 through which the electric wire 150 is led out and one corner portion closest to the shaft portion 113 are the same is suitable.

Figure 17B:
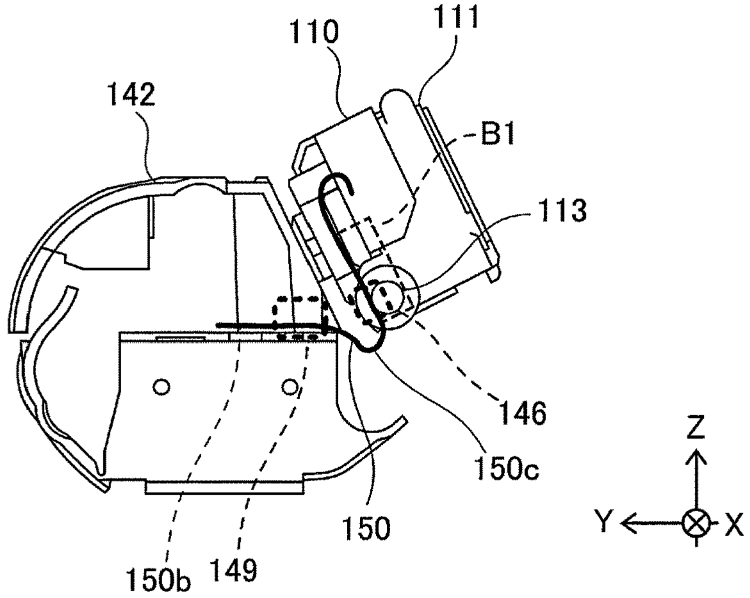
Figure 17C:
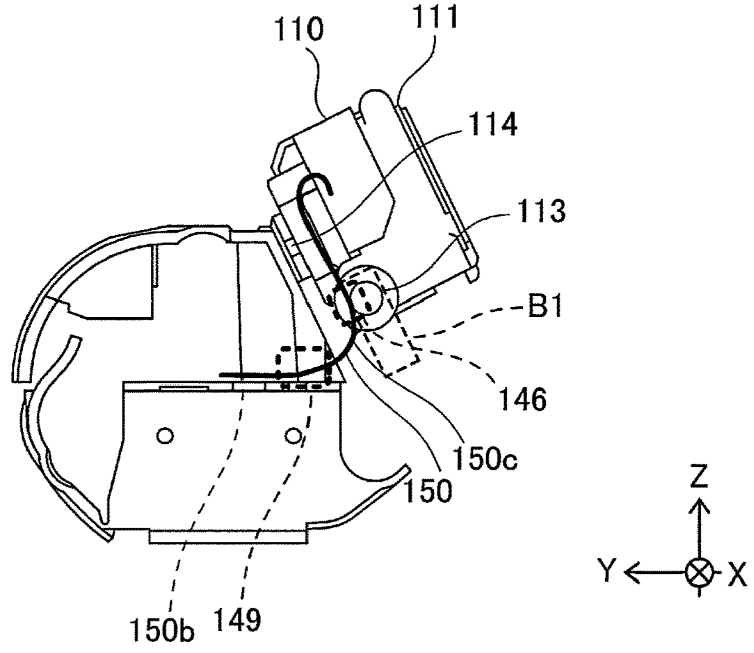

Thus, in the case where the electric wire 150 is wired through the neighborhood of the rotational axis A2 of the reading unit 110, when the reading unit 110 is rotated about the rotational axis A2, the electric wire 150 is flexed principally in the neighborhood of the rotational axis A2 (see FIG. 17B). That is, the electric wire 150 is flexed so that the inner unit portion 150*a* of the electric wire 150 is rotated about the neighborhood of the rotational axis A2 as a supporting point. For that reason, a fluctuation in distance from the outlet 146 of the electric wire 150 on the reading unit 110 side to the inlet 149 of the electric wire 150 on the ADF main body 10A side is small. When this fluctuation is large, there is a liability that the electric wire 150 is broken or disconnected by tension. For that reason, it would be considered that an excessive length of the intermediary portion 150*c* is increased by taking a fluctuation amount into consideration, but when the excessive length of the intermediary portion 150*c* is increased, this increase leads to an increase in cost and upsizing of the apparatus. On the other hand, in this embodiment, the fluctuation amount of the distance from the outlet of the electric wire 150 on the reading unit 110 side to the inlet of the electric wire 150 on the ADF main body 10A side is small, and therefore, even when the excessive length of the intermediary portion 150*c* is set at a small value, breakage or the like does not readily occur, so that the increase in cost and upsizing of the apparatus can be prevented.

Incidentally, in the case where a constitution in which the reading unit 110 is rotated integrally with the rotation guide 141 is employed, wiring of the electric wire 150 through the neighborhood of the rotational axis A2 becomes difficult. This is attributable to the following circumstances. First, the conveying guide for guiding the sheet, such as the rotation guide 141 is a relatively large member extending along the sheet conveying passage. For that reason, when such a large member is intended to be rotated, it is natural that the rotational axis of the conveying guide is disposed in the neighborhood of an upstream end or a downstream end of the conveying guide with respect to the feeding direction of the sheet to be guided. On the other hand, the reading unit is disposed at a position (below the rotation guide 141 in the case of the reading unit 110) apart from the guiding surface of the conveying guide so as not to prevent the feeding of the sheet, and therefore, it becomes difficult that the outlet of the electric wire from the reading unit is disposed in the neighborhood of the rotational axis of the conveying guide. Further, in the neighborhood of the conveying guide, the feeding roller for feeding the sheet is disposed in many cases, so that when the reading unit is intended to be disposed while avoiding interference with the feeding roller, it becomes further difficult that the outlet of the electric wire from the reading unit is disposed in the neighborhood of the rotational axis of the conveying guide. With an increasing distance of the outlet of the electric wire, from the reading unit, from the rotational axis of the conveying guide, a fluctuation amount of the distance from the outlet of the downstream on the reading unit side to the inlet of the electric wire on the ADF main body side when the conveying guide is rotated becomes large. As a result, a breakage risk of the electric wire 150 arises.

On the other hand, in this embodiment, the reading unit 110 employs a mechanism rotatable separately from the rotation guide 141, and therefore, the electric wire 150 can be wired through the neighborhood of the rotational axis A2 of the reading unit 110. Further, the rotational axis A2 of the reading unit 110 can be disposed below the guiding surface of the rotation guide 141. As a result, as described above, the breakage of the electric wire 150 can be made hard to occur.

[Details of Arm]

Next, a constitution in which an operating property when the reading unit 110 is moved while being made rotatable in a wide rotation range is capable of being improved will be described using FIGS. 7 and 8.

The reading unit 110 assumes an attitude in the reading position such that the glass 111 faces downward with respect to the Z-direction and assumes an attitude in the maintenance position such that the glass 111 is exposed to the outside as viewed from above with respect to the Z-direction. That is, in this embodiment, the transparent member faces downward with respect to the vertical direction in a state in which the reading unit is positioned in the first position and faces upward with respect to the vertical direction in a state in which the reading unit is positioned in the second position.

When a degree of inclination of the glass 111 relative to the horizontal direction in the reading position is excessively large, a degree of flexure of the original conveying passage P1 becomes large, so that feeding of thick paper or the like becomes difficult, and therefore, an angle of the inclination of the glass 111 is, for example, 45 degrees or less, preferably 30 degrees or less. For that reason, the reading unit 110 is constituted so as to be rotatable between the read position and the maintenance position with a rotation range of, for example, 60 degrees or more, preferably 75 degrees or more, more preferably 90 degrees or more.

In the case where the reading unit 110 is rotated within such a rotation range, in a constitution in which an operator directly puts one's hand on the reading unit 110, the hand is liable to be caught between the rotated reading unit 110 and another portion of the ADF 10, so that there was room for improvement in operating property.

As described above, in this embodiment, the free end portion of the arm 131 interrelated with the rotation of the rotation guide 141 is contacted to the reading unit 110 from below, so that the reading unit 110 is rotated in interrelation with the rotation guide 141 (see FIGS. 5 and 6). At this time, the arm 131 is rotated in a rotational direction opposite to the rotational direction of the reading unit 110, so that the reading unit 110 is moved from the reading position to the maintenance position while changing a contact position of the arm 131 with the reading unit 110. For this reason, the operating property can be improved while enabling the rotation of the reading unit 110 within a wide rotation range.

Further, the reading unit 110 can be made movable from the reading position to the maintenance position with a small operating force to the extent possible, so that an operation load can be alleviated. In the following, this will be specifically described.

Figure 7:
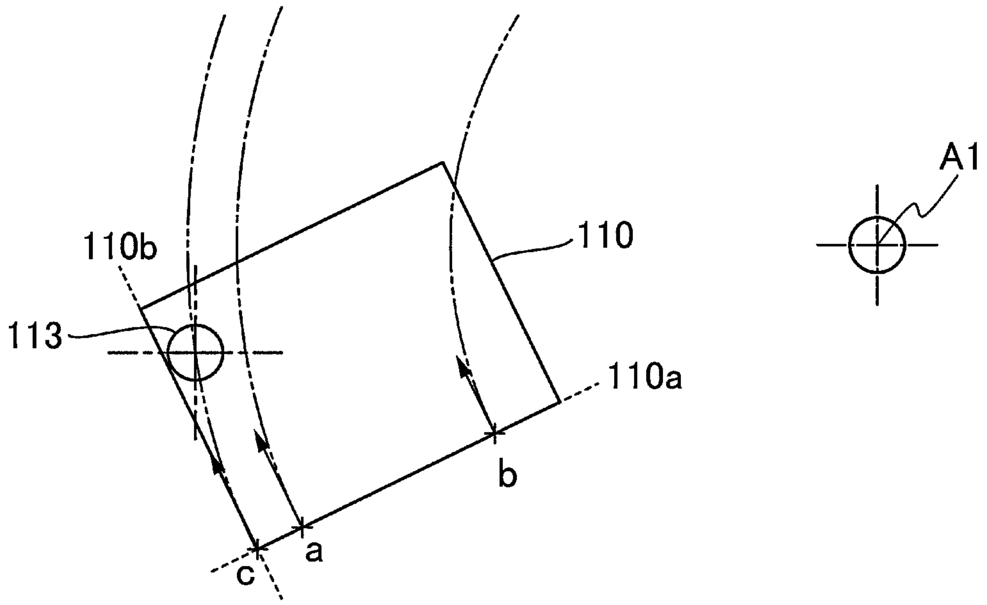
FIG. 7 is a schematic view for illustrating a force acting from an arm on the reading unit.

FIG. 7 shows a positional relationship between the reading unit 110, the rotational axis A1 of the arm 131, and the rotational axis A2 of the reading unit 110 when the arm 131 is first contacted to the reading unit 110. In order to rotate the reading unit 110 in the counterclockwise direction by the contact of the arm 131 from below, it is efficient to bring the arm 131 into contact with the first contact surface 110*a* which is a surface (where the glass 111 is disposed) on a lower side of the reading unit 110 in the reading position.

Then, in order to consider that the arm 131 is contacted at which position of the first contact surface 110*a*, three points a, b and c will be considered. A chain double-dashed line passing through each of the points is a rotation locus about the rotational axis A1 for an associated point, and an arrow represents a tangential direction (direction of a load when the reading unit 110 is pressed at the associated point) thereof.

In the case where the arm 131 is contacted to the reading unit 110 at the point a, a load direction substantially extends toward the rotational axis A2 of the reading unit 110, and therefore, efficiency is poor for rotating the reading unit 110. In the case where the arm 131 is contacted to the reading unit 110 at the point c, rather, moment in the clockwise direction in FIG. 7 which is a direction opposite to a direction in which the operator intends to rotate the reading unit 110 acts on the reading unit 110. On the other hand, as at the point b, in the case where the arm 131 is contacted to the reading unit 110 at a position, on the first contact surface 110*a*, apart from the rotational axis A2 on a right-hand side in the figure, the reading unit 110 is rotated even when the load required to press the reading unit 110 by the arm 131 is relatively small.

Figure 8:
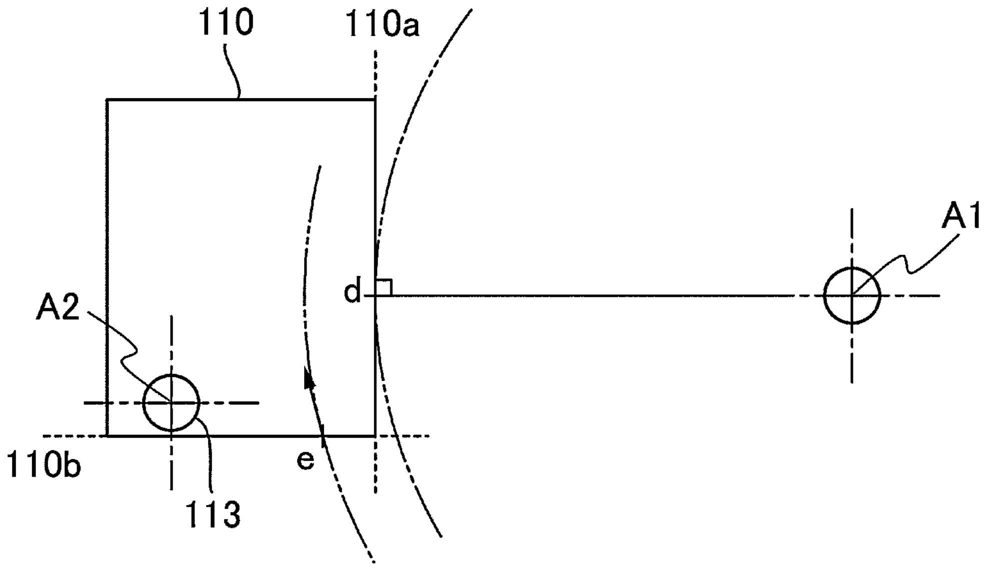
FIG. 8 is a schematic view for illustrating a maximum rotation angle in the case where the arm originals only one surface of the reading unit.

FIG. 8 shows a maximum angle at which the reading unit 110 can be rotated by pushing the first contact surface 110*a* from below. If the arm 131 is contacted to the first contact surface 110*a* at a point d, when the reading unit 110 is rotated to a position where the first contact surface 110*a* is vertically disposed, at the point d, the arm 131 cannot further press the reading unit 110. In order to further rotate the reading unit 110, as shown at a point e, a constitution in which the arm 131 contacts and presses the reading unit 110 at the second contact surface 110*b* different from the first contact surface 110*a* is employed.

In this embodiment, in view of the above, a constitution in which the arm 131 is provided with the two contact portions (131*a*, 131*c*) and in which the two contact portions are successively contacted to the first contact surface 110*a* and the second contact surface 110*b*, respectively, is employed.

In the following, such a constitution will be described. As shown in FIG. 5B, at the free end portion of the arm 131 in this embodiment, the three arc profiles 131*a*, 131*b* and 131*c* are provided.

From the rotational axis A1 toward an outside with respect to a radial direction, these arc profiles are referred to as a first arc profile 131*a*, a second arc profile 131*b*, and a third arc profile 131*c*. The first arc profile 131*a* and the third arc profile 131*b* are arcuately curved surfaces which are each projected toward a downstream side of the rotational direction (the clockwise direction in FIG. 5B) of the arm 131 when the arm 131 presses the reading unit 110. The first arc profile 131*a* is a first projection for pressing the first contact surface 110*a* (first surface) of the reading unit 110. The third arc profile 131*c* is a third projection for pressing the second contact surface 110*b* (second surface) of the reading unit 110. The second arc profile 131*b* is an arcuately curved surface which is concaved between the first arc profile 131*a* and the third arc profile 131*c* and which forms a space for receiving a corner portion 110*c* between the first contact surface 110*a* and the second contact surface 110*a*. Incidentally, in this embodiment, the first contact surface 110*a* and the second contact surface 110*c* are adjacent two surfaces (surfaces crossing perpendicularly each other) of the reading unit 110 which has a substantially rectangular shape as viewed in the X-direction, but surfaces extending in directions crossing each other at an angle different from a right angle may be the first surface and the second surface, respectively.

In this embodiment, the first contact surface 110*a* of the reading unit 110 is a surface of the glass sheet 115 (gap forming member) sticked to the glass 111. The arm 131 is prevented from directly contacting the glass 111, whereby a possibility that the glass 111 is changed is reduced. Incidentally, as shown in FIG. 4, a contact position of the arm 131 with the gap sheet 115 is deviated from an abutment region of the shading plate 144 against the gap sheet 115 in the X-direction. For that reason, even when the surface of the first contact surface 110*a* of the gap sheet 115 to which the arm 131 is repetitively contacted is roughened, accuracy of a gap width (range) formed between the glass 111 and the shading plate 144 is not lowered.

As shown in FIG. 5B, when the arm 131 is rotated in interrelation with the rotation of the rotation guide 141, first, the first arc profile 131*a* contacts the first contact surface 110*a* of the reading unit 110 and causes the reading unit 110 to start to rotate from the reading position. At this time, the third arc profile 131*c* does not contact the second contact surface 110*b* of the reading unit 110.

When the arm 131 is further rotated and thus an angle of the reading unit 110 reaches a predetermined angle, the third arc profile 131*c* contacts the second contact surface 110*b*, and the first arc profile 131*a* is separated from the first contact surface 110*a*. Then, the third arc profile 131*c* presses the second contact surface 110*b*, so that as shown in FIG. 6, the reading unit 110 is rotated to the maintenance position.

When the reading unit 110 reaches the maintenance position, as shown in FIG. 6, the pressing portion 114 of the reading unit 110 abuts against the abutment surface 142*a* of the conveying guide 142 fixed to the frame of the ADF main body 10A. At this time, by elasticity of the elastic member (compression spring 114*b*) provided on the pressing portion 114, an impact of abutment of the reading unit 110 against the conveying guide 142 is alleviated. That is, the pressing portion 114 performs not only positioning action on the reading unit 110 during the image reading but also a function of a buffer when the reading unit 110 is moved to the maintenance position.

Thus, a constitution in which the contact position between the arm 131 and the reading unit 110 is switched depending on the rotation angle of the reading unit 110 is employed, so that while the reading unit 110 is made rotatable in the wide rotation range, an operation load can be alleviated. Further, a recessed arc profile 131*c* is provided between the two projections of the arm 131 contacting the first contact surface 110*a* and the second contact surface 110*b* of the reading unit 110, and therefore, the arm 131 and the reading unit 110 are not put in a locked state by the two projections. That is, the corner portion 110*c* between the first contact surface 110*a* and the second contact surface 110*b* is accommodated in a space inside the arc profile 131*c*, so that the state between the arm 131 and the reading unit 110 is smoothly shifted from a contact state between the first arc profile 131*a* and the first contact surface 110*a* to a contact state between the third arc profile 131*c* and the second contact surface 110*b*.

Further, in this embodiment, the three arc profiles 131*a*, 131*b* and 131*c* are smoothly connected to each other (i.e., a tangential direction is not changed discontinuously), and therefore, even when the contact position of the reading unit 110 is switched between the respective profiles, smooth rotation can be realized.

Incidentally, in this embodiment, the case where each of the two projections and the recess between the two projections is constituted by the arcuate curves was described, but these portions may also be constituted as curves other than the arcuate curves.

Modified Embodiment 1

Figure 9:
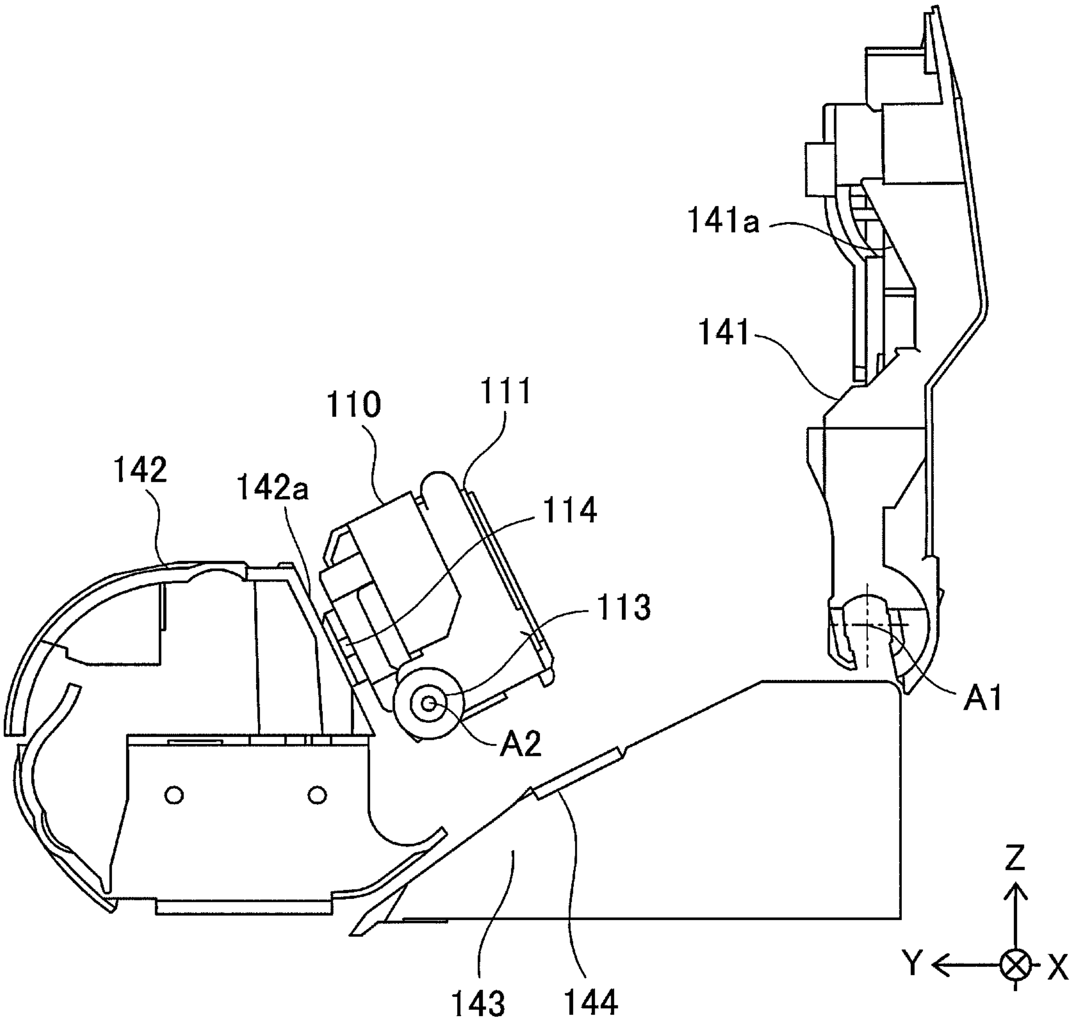
FIG. 9 is a schematic view showing a part of an ADF according to a modified embodiment.

In the embodiment 1, the constitution in which the reading unit 110 is rotated in interrelation with opening and closing of the rotation guide 141 through the arm 131 moved in interrelation with the opening and closing of the rotation guide 141 was described. The present invention is not limited thereto, and a constitution as shown in FIG. 9 in which the arm 131 is not provided and in which the operator directly rotates the reading unit 110 by one's hand(s) may be employed. In this case, in order to move the reading unit 110 to the maintenance position, the operator first rotates the rotation guide 141 from the closed position to the open position while holding the rotation guide 141, and then rotates the reading unit 110 from the reading position to the maintenance position while holding the reading unit 110.

Modified Embodiment 2

Further, as another constitution in which the reading unit 110 is rotated in interrelation with the opening and closing of the rotation guide 141, a constitution in which a part of the rotation guide 141 is contacted to the reading unit 110 in a manner such that the arm 131 is formed integrally with the rotation guide 141 may be employed. Incidentally, in the embodiment 1, the constitution in which the arm 131 is rotatable relative to the rotation guide 141 and in which the rotation range of the arm 131 is narrower than the rotation range of the rotation guide 141 is employed, and therefore, as described above, downsizing of the apparatus can be realized compared with this modified embodiment.

Modified Embodiment 3

In the embodiment 1, the case where the arm 131 is disposed on one side of the reading unit 110 and the rotation guide 141 with respect to the X-direction was described, but the arm 131 may be disposed on each of opposite sides with respect to the X-direction. In that case, a torsional load is not readily exerted on the reading unit 110 and the rotation guide 141.

Embodiment 2

An embodiment 2 will be described using FIGS. 10 to 12. This embodiment is different from the embodiment 1 in that a constitution in which in a state in which the rotation guide

141 is moved to the open position in advance, the operator holds and operates the operating portion of the arm 131 and thus rotates the reading unit 110 is employed. In the following, elements represented by reference numerals or symbols common to the embodiments 1 and 2 are regarded as those having substantially the same constitutions and functions, and an element different from those in the embodiment 1 will be principally described.

Figure 10:
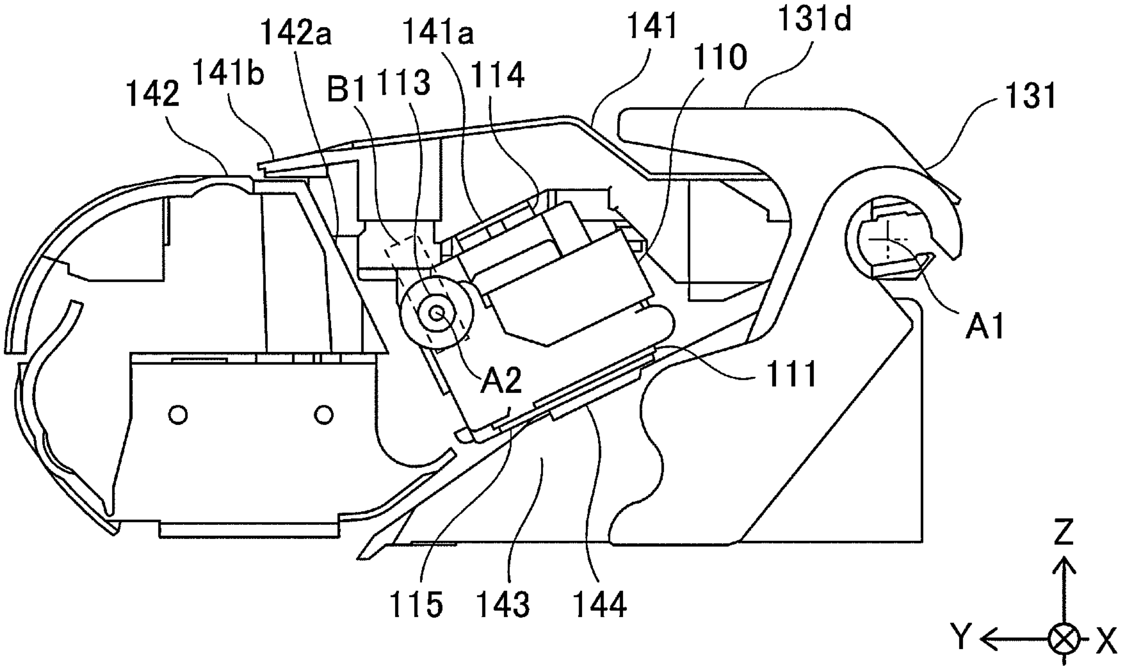
FIG. 10 is a schematic view showing a part of an ADF according to an embodiment 2.

As shown in FIG. 10, the arm 131 in this embodiment is provided with an arm operating portion 131*d* as an operating portion (lever, handle). The arm operating portion 131*d* is disposed, for example, so as to project upward from the guiding surface of the rotation guide 141 on a front side of the image forming apparatus 1 relative to the rotation guide 141 in order to facilitate access by the operator in a state in which the upper portion cover 147 is opened. The arm operating portion 131*d* will be described as being rotated integrally with another portion of the arm 131, but may be connected rotatably relative to the aforementioned another portion so as to be interrelated with the aforementioned another portion only in a predetermined rotation range.

In the case where the reading unit 110 is moved from the reading position to the maintenance position during a maintenance operation, the operator opens the upper portion cover 147 in advance, and then moves the rotation guide 141 to the open position. In this state, the operator puts one's hand on the arm operating portion 131*a* and rotates the arm 131 in the clockwise direction in FIG. 10.

Figure 11:
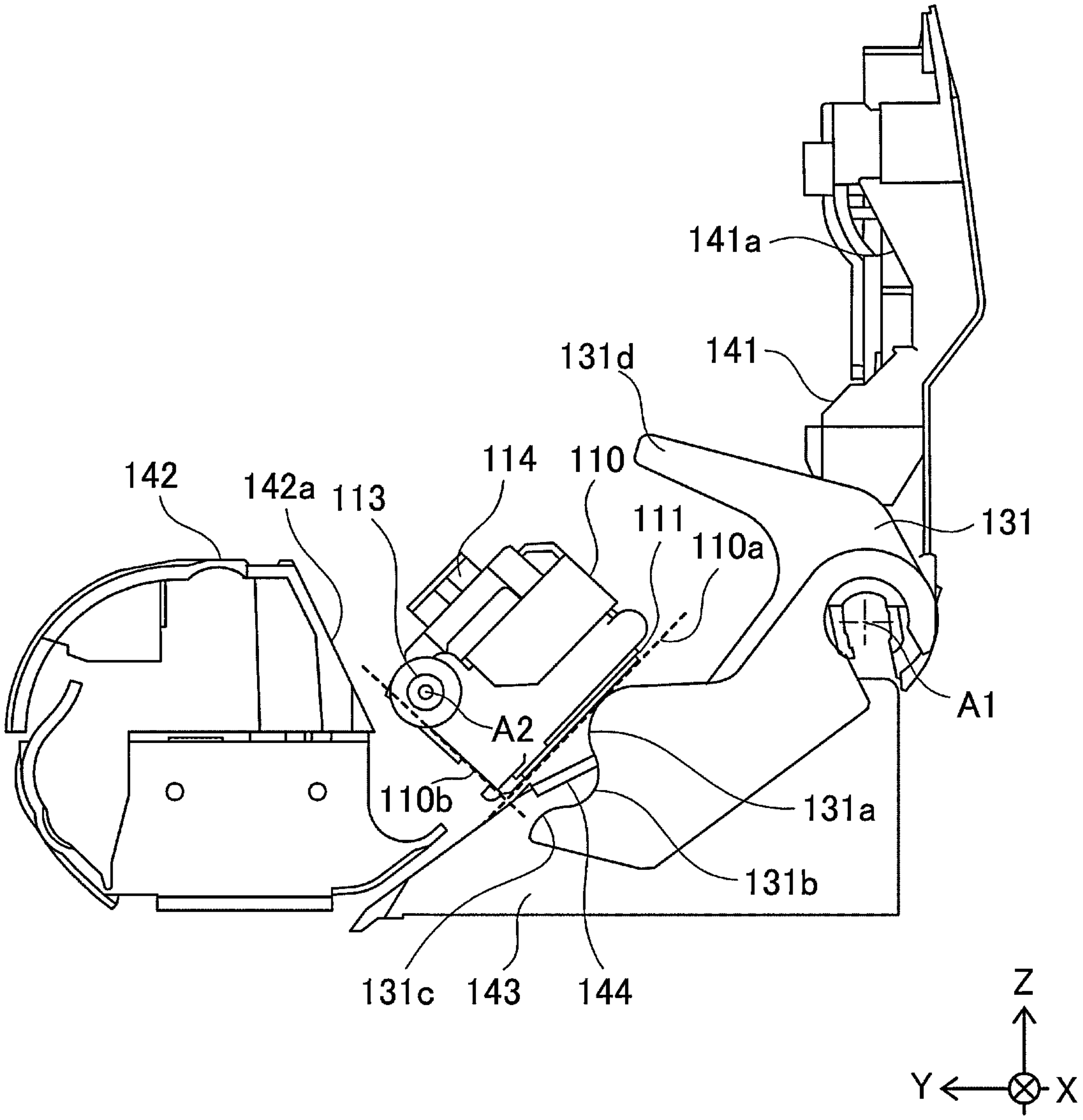
FIG. 11 is a schematic view showing the part of the ADF according to the embodiment 2.
Figure 12:
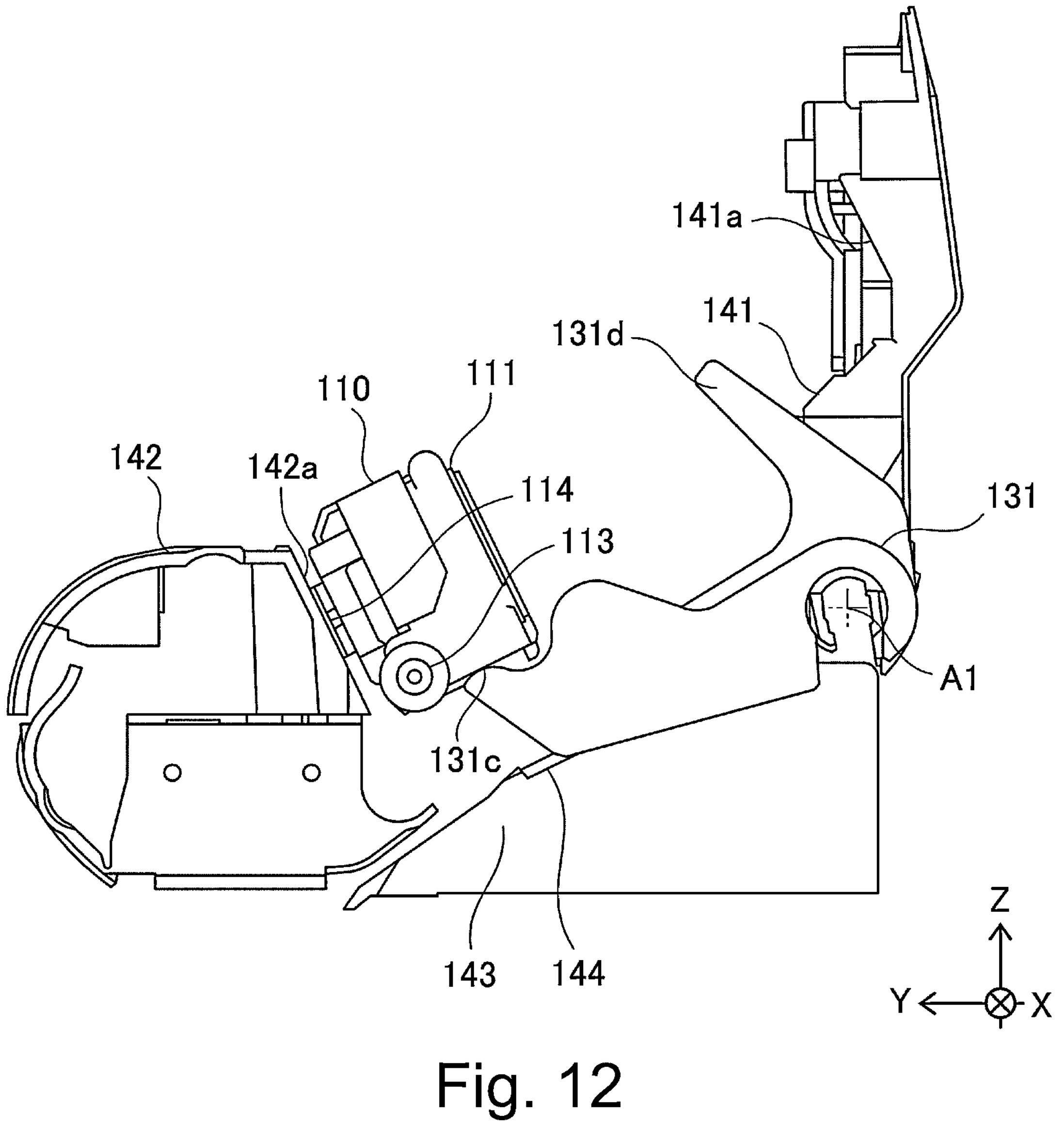
FIG. 12 is a schematic view showing the part of the ADF according to the embodiment 2.

Then, as shown in FIGS. 11 and 12, the arc profiles 131*a* and 131*c* provided on the free end portion side of the arm 131 contacts and presses the reading unit 110 and rotates the reading unit 110 about the shaft 113 in the counterclockwise direction in the figures. By this, the reading unit 110 is moved from the reading position shown in FIG. 10 to the maintenance position shown in FIG. 11. Thus, the reading unit 110 is constituted so as to be rotatable independently of the rotation guide 141, so that it is possible to reduce impact received by the reading unit 110 when the reading unit 110 is moved when cleaning of the glass 111 or the jam clearance is performed.

Further, in a process in which the arm 131 is rotated, similarly as in the embodiment 1, to two arc profiles 131*a* and 131*c* provided on the arm 131 successively contact the first contact surface 110*a* and the second contact surface 110*b*. At this time, the operator may only be required to operate the arm operating portion 131*d* in the case where the reading unit 110 is moved to the maintenance position, so that a possibility that the operator's hand is caught between the reading unit 110 and ADF main body 10A is low. Accordingly, the operating property can be improved while making the reading unit 110 rotatable within a wide rotation range.

Incidentally, also in this embodiment, the reading unit 110 is constituted so as to be rotatable independently of the rotation guide 141, so that a breakage risk of the electric wire 150 when the reading unit 110 is rotated is capable of being reduced.

Embodiment 3

An embodiment 3 will be described using FIGS. 13 and 14. This embodiment is different from the embodiment 1 in that in position of a rotational axis of the reading unit 110 and a rotational direction of the reading unit 110 are different from those in the embodiment 1. In the following, elements represented by reference numerals or symbols common to the embodiments 1 and 3 are regarded as those having substantially the same constitutions and functions, and an element different from those in the embodiment 1 will be principally described.

Figure 13:
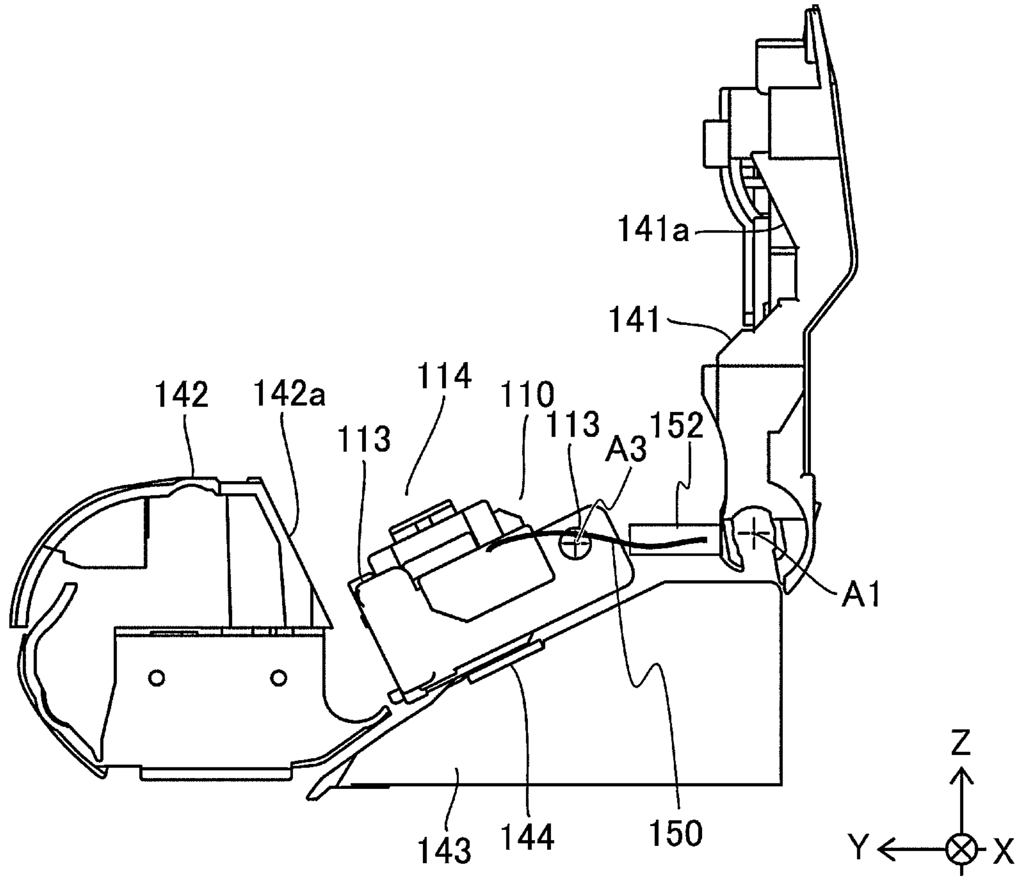
FIG. 13 is a schematic view showing a part of an ADF according to an embodiment 3.
Figure 14:
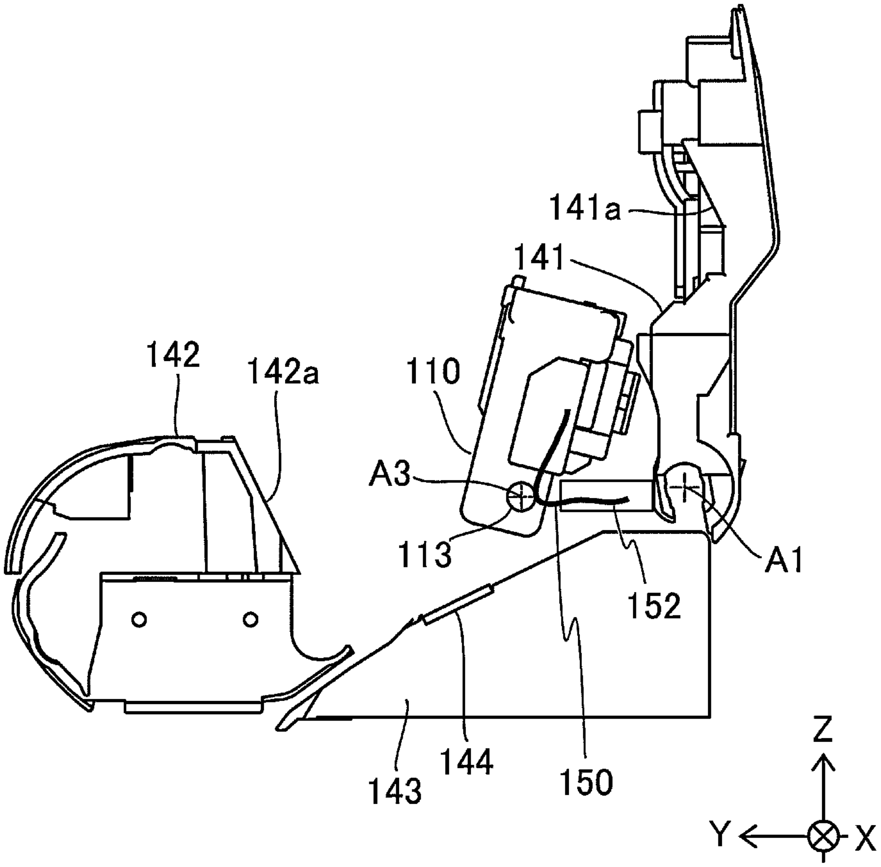
FIG. 14 is a schematic view showing the part of the ADF according to the embodiment 3.

As shown in FIG. 13, the reading unit 110 includes the shaft portion 113 and is rotatable about a rotational axis A3 (third rotational axis) different from the rotational axis A1 of the rotation guide 141 as the conveying guide. In this embodiment, the rotational axis A3 of the reading unit 110 is provided on one side of the Y-direction of the reading unit 110 (negative side of the Y-direction) and at an end portion on an upper side of the Z-direction. That is, in this embodiment, the second rotational axis is provided at an upstream-side end portion of the conveying guide with respect to the sheet feeding direction (leftward direction in FIG. 13) of the sheet guided by the conveying guide. The third rotational axis is provided at the upstream-side end portion of the reading unit with respect to the sheet feeding direction of the sheet guided by the conveying guide.

For this reason, the rotation guide 141 is rotated clockwise about the rotational axis A1 from the closed position toward the open position, and the reading unit 110 is rotated clockwise about the rotational axis A3 from the reading position to the maintenance position. Thus, even in a constitution in which the rotational directions of the rotation guide 141 and the reading unit 110 when the glass 111 as the transparent member is exposed to the outside are the same, it is possible to achieve effects similar to the effects of the embodiments 1 and 2. Whether the rotational directions of the rotation guide 141 and the reading unit 110 are made the same direction or different directions is selected depending on a specific constitution of the ADF 10, such as a positional relationship of these members with members provided at a periphery of these members, or the like.

Incidentally, in this embodiment, the position of the rotational axis A3 of the reading unit 110 is different from those in the embodiments 1 and 2, and therefore, it is preferable that a wiring path of the electric wire 150 connected to the reading unit 110 is also changed from those in the embodiments 1 and 2. As shown in FIG. 13, the electric wire 150 is led out from the inside to the outside of the reading unit 110 through the neighborhood of the rotational axis A3 of the reading unit 110. At this time, the electric wire 150 is different from the electric wire 150 in the embodiment 1, and is led out to the negative side of the Y-direction (downstream side of the sheet feeding direction in the reading position) and then is guided and wired by a guiding member 152 provided on the frame of the ADF main body 10A.

A distance from the rotational axis A3 of the reading unit 110 to an outlet where the electric wire 150 is led out from the reading unit 110 is shorter than at least a distance from the rotational axis A1 of the rotation guide 141 to the outlet. Further, the neighborhood of the rotational axis A3 is suitable when the electric wire 150 passes through a position where the rotational axis A3 overlaps with the shaft portion 113 in a state in which the rotational axis A3 is viewed specifically in the X-direction. Further, it is suitable that of four corner portions of the reading frame 119 which has a substantially rectangular shape as viewed in the X-direction, one corner portion is closest to the outlet through which the electric wire 150 is led out and is closest to the shaft portion 113.

Thus, in the case where the electric wire 150 is wired through the neighborhood of the rotational axis A3 of the reading unit 110, when the reading unit 110 is rotated about the rotational axis A3, the electric wire 150 is principally flexed in the neighborhood of the rotational axis A3 (see FIG. 13). For that reason, a fluctuation in distance from the outlet of the electric wire 150 on the reading unit 110 side to the inlet 149 (opening through which the electric wire 150 is received or a guiding member for holding the electric wire 150) of the electric wire 150 on the ADF main body 10A side is small. Accordingly, even in the constitution of this embodiment, it is possible to reduce a possibility of breakage of the electric wire 150.

Embodiment 4

An embodiment 4 will be described using FIG. 15. This embodiment is different from the embodiment 2 in position of the rotational axis of the rotation guide 141 and the rotational direction of the rotation guide 141. In the following, elements represented by reference numerals or symbols common to the embodiments 2 and 4 are regarded as those having substantially the same constitutions and functions, and an element different from those in the embodiment 2 will be principally described.

Figure 15:
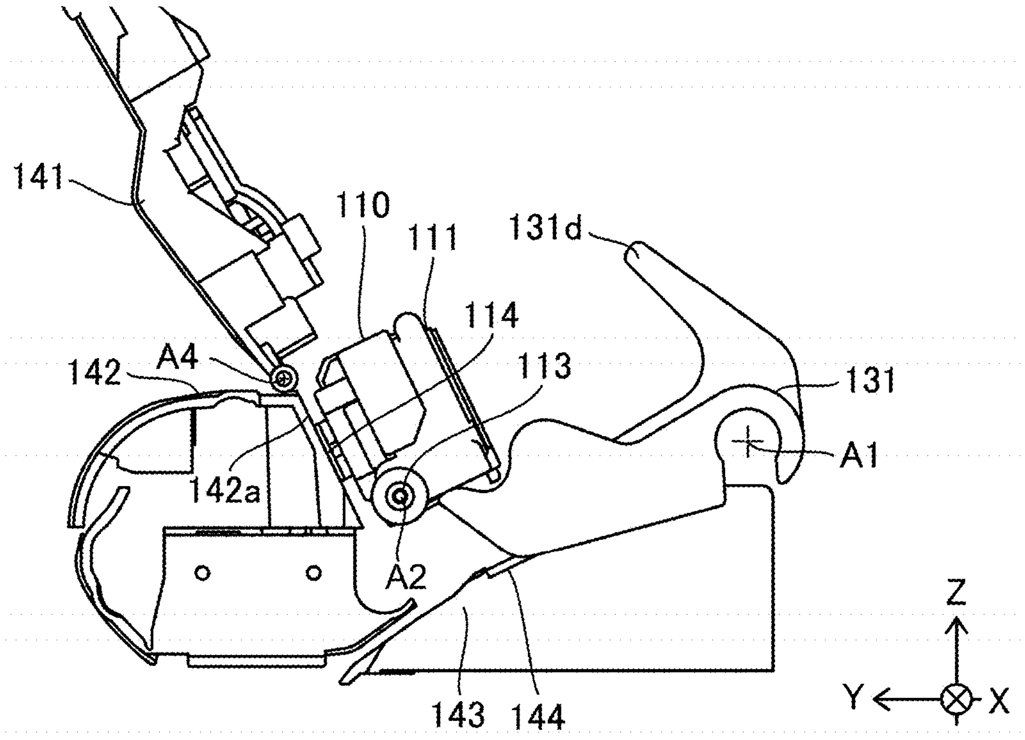
FIG. 15 is a schematic view showing an ADF according to an embodiment 4.

As shown in FIG. 15, the rotation guide 141 as the conveying guide is provided rotatably about a rotational axis A4 (second rotational axis). The rotational axis A4 is provided at an end portion of the rotation guide 141 on a downstream side (left-hand side in FIG. 15, positive side of the Y-direction) with respect to the sheet feeding direction of the sheet guided by the rotation guide 141. That is, in this embodiment, the second rotational axis is provided at the downstream-side end portion of the conveying guide with respect to the sheet feeding direction of the sheet guided by the conveying guide. The third rotational axis is provided at a downstream-side end portion of the reading unit with respect to the sheet feeding direction of the sheet guided by the rotation guide.

For this reason, the rotation guide 141 is rotated counterclockwise about the rotational axis A4 in FIG. 15 from the closed position toward the open position, and the reading unit 110 is rotated counterclockwise about the rotational axis A2 in FIG. 15 from the reading position toward the maintenance position. Even in such a constitution, it is possible to obtain effects similar to the effects of the embodiments 1 and 2.

Modified Embodiment

A modified embodiment will be described using FIG. 16. In this modified embodiment, the position of the rotational axis A4 of the rotation guide 141 and the rotational direction of the rotation guide 141 in the embodiment 4, and the position of the rotational axis A3 of the reading unit 110 and the rotational direction of the reading unit 110 in the embodiment 3 are combined with each other. That is, in this modified embodiment, the second rotational axis is provided at the downstream-side end portion of the conveying guide with respect to the sheet feeding direction of the sheet guided by the conveying guide. The third rotational axis is provided at the upstream-side end portion of the reading unit with respect to the sheet feeding direction of the sheet guided by the conveying guide.

Figure 16:
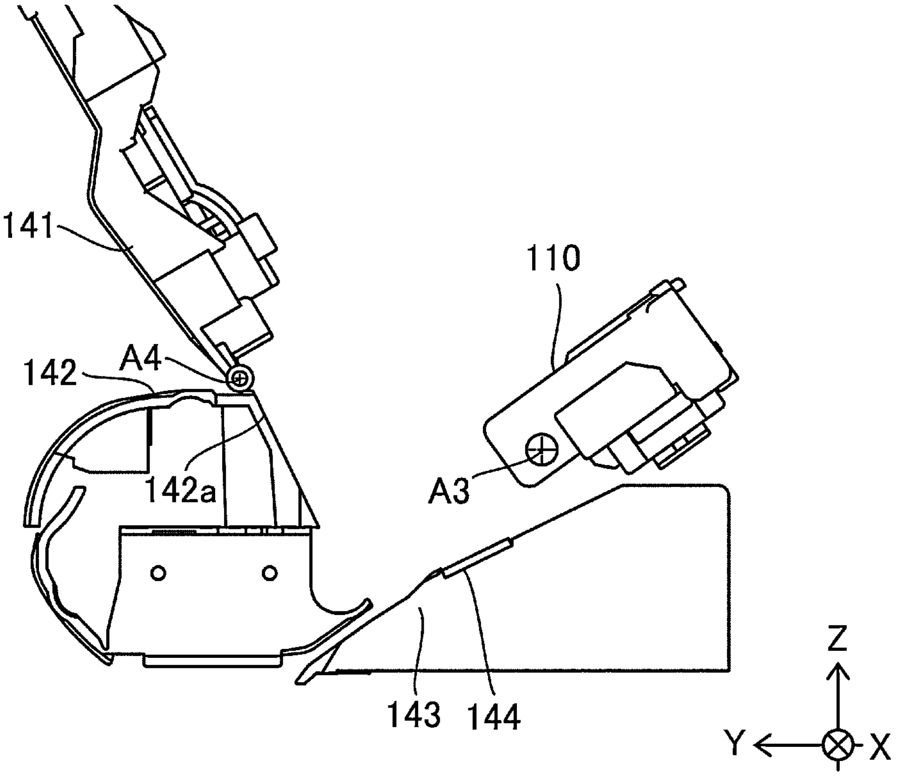
FIG. 16 is a schematic view showing the ADF according to the embodiment 4.

For this reason, the rotation guide 141 is rotated counterclockwise about the rotational axis A4 in FIG. 16 from the closed position toward the open position and the reading unit 110 is rotated clockwise about the rotational axis A3 in FIG. 16 from the reading position toward the maintenance position. Even in such a constitution, it is possible to obtain effects similar to the effects of the embodiments 1 and 2.

Embodiment 5

An embodiment 5 will be described using FIGS. 18 and 19. This embodiment is different from the embodiment 2 in that a plurality of arm members are contacted to the first contact surface and the second contact surface of the reading unit. In the following, elements represented by reference numerals or symbols common to the embodiments 2 and 5 are regarded as those having substantially the same constitutions and functions, and an element different from those in the embodiment 2 will be principally described.

The ADF 10 in this embodiment includes an arm 132 as a first arm member and an arm 133 as a second arm. The arms 132 and 133 are rotatably supported by the frame of the ADF main body 10A and are rotated about the rotational axis A1. The arms 132 and 133 overlap with each other as viewed in the X-direction. Further, the arms 132 and 133 can be rotated by operating the arm operating portion 131*d*. Even in such a constitution, an effect similar to the effect of the embodiment 1 can be achieved.

Figure 18:
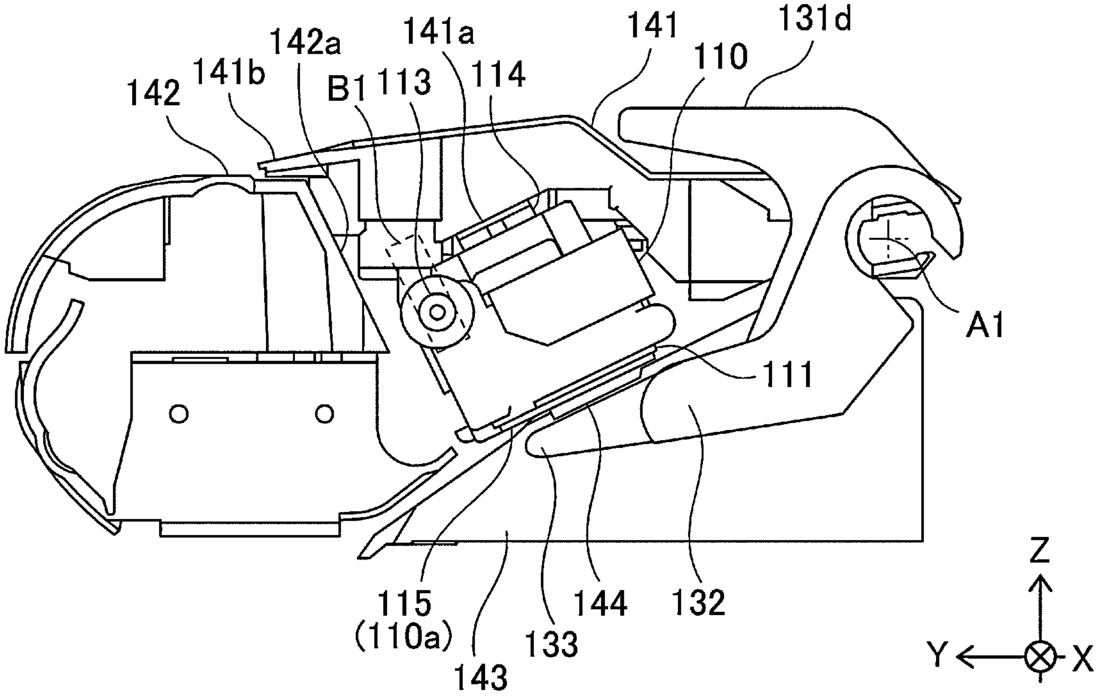
FIG. 18 is a schematic view showing an ADF according to an embodiment 5.
Figure 19:
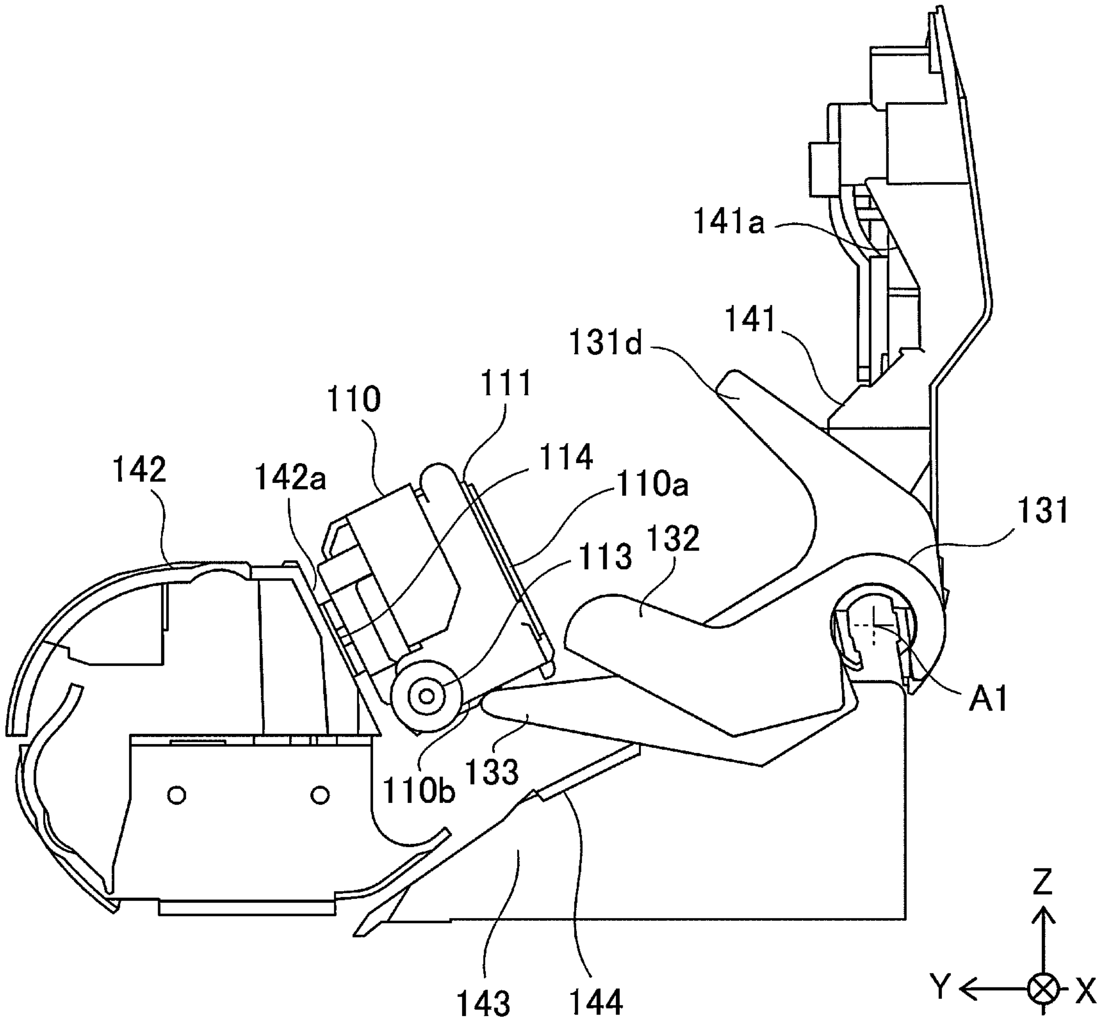
FIG. 19 is a schematic view showing the ADF according to the embodiment 5.

In the case where the arm operating portion 131*d* is rotated in the clockwise direction from a state of FIG. 18, first, the arm 132 is rotated and contacted to the first contact surface 110*a* of the reading unit 110. Then, at the time when the arm 132 is rotated by a predetermined angle, the arm 133 starts rotation and is contacted to the second contact surface 110*b* of the reading unit 110. By this, as shown in FIG. 19, the reading unit 110 is rotated to the maintenance position. Thus, the arms 132 and 133 press a plurality of surfaces of the reading unit 110, so that it is possible to realize rotation of the reading unit 110 in a wide rotation range. Further, by employing a constitution in which the two arms 132 and 133 which overlap with each other are interrelated with each other with a time difference, it is possible to reduce a space necessary to arrange the arms 132 and 133.

Embodiment 6

An embodiment 6 will be described using FIGS. 20 and 21. This embodiment is different from the embodiment 2 in that a reading unit-side contact surface to which the arm member is contacted is made a curved surface and thus a rotation range of the reading unit is ensured. In the following, elements represented by reference numerals or symbols common to the embodiments 2 and 6 are regarded as those having substantially the same constitutions and functions, and an element different from those in the embodiment 2 will be principally described.

Figure 20:
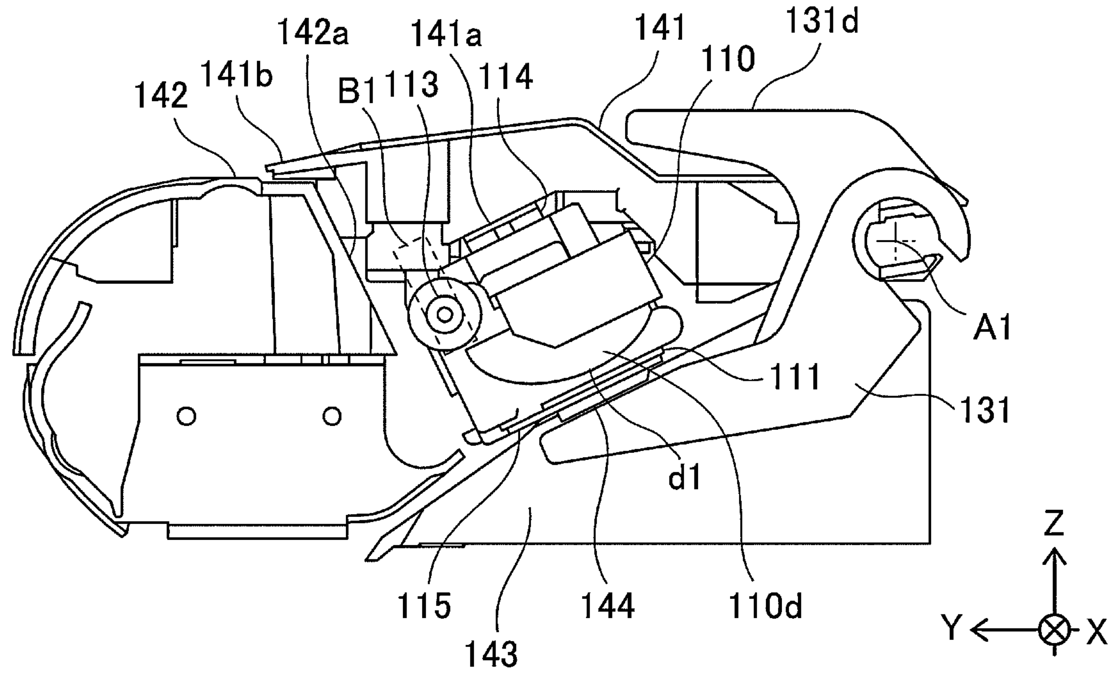
FIG. 20 is a schematic view showing an ADF according to an embodiment 6.
Figure 21:
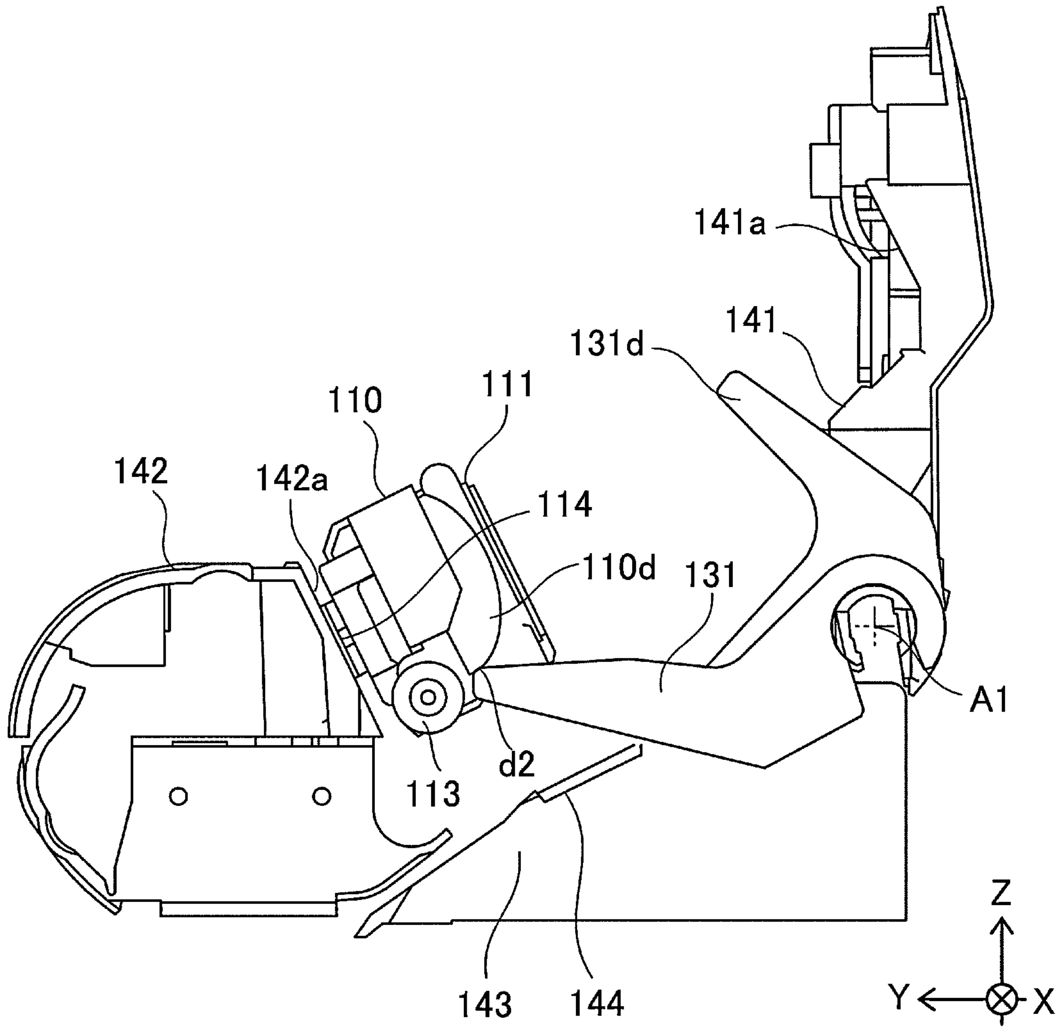
FIG. 21 is a schematic view showing the ADF according to the embodiment 6.

As shown in FIG. 20, the reading unit 110 in this embodiment includes an arm contact surface 110*d* different from the surface on which the glass 111 is disposed. The arm contact surface 110*d* is substantially arcuate curved surface which projects toward an upstream side of the rotational direction (downstream direction in FIG. 20) of the arm 131 in a state in which the arm contact surface 110*d* is viewed in the X-direction. On the other hand, a free end of the arm 131 is formed in a substantially linear shape along a rectilinear line passing through the rotational axis A1. The arm contact surface 110*d* is the curved surface which is substantially continuous at least between a first contact point d1 (FIG. 20) and a second contact point d2 (FIG. 21).

The first contact point d1 is a position where the reading unit 110 is contacted to the arm 131 in a state in which the reading unit 110 is positioned in the reading position. The second contact point d2 is a position where the reading unit 110 is contacted to the arm 131 in a state in which the reading unit 110 is positioned in the maintenance position.

When the arm 131 is rotated in the clockwise direction in FIG. 20, the arm 131 rotates the reading unit 110 from the reading position to the maintenance position while continuously changing a contact position to the arm contact surface 110*d* from the first contact point d1 to the second contact point d2. Therefore, according to the constitution of this embodiment, even when the arm 131 is formed in a simple shape, an effect similar to the effect of the embodiment 2 can be obtained, so that a degree of design freedom can be enlarged.

OTHER EMBODIMENTS

In the above-described embodiments, the constitution in which the present invention is applied to the image reading apparatus installed at an upper portion of the apparatus main assembly of the image forming apparatus was described. The present invention is not limited thereto, and is also applicable to an image reading apparatus which is independent of an image forming apparatus.

According to the present invention, it is possible to facilitate cleaning of the glass surface of the reading unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-105488 filed on Jun. 25, 2021, which is hereby incorporated by reference herein in its entirety.

What is claimed is:

1. An image reading apparatus comprising:

a main body;

a sheet conveying member configured to convey a sheet along a sheet conveying passage;

a cover unit provided to be rotatable relative to said main body and including an upper surface of said image reading apparatus; and a reading unit which includes a transparent member and a reading portion configured to read, through said transparent member, an image on the sheet conveyed by said sheet conveying member, wherein said reading unit is rotatable, relative to said main body, between a first position where said transparent member opposes the sheet conveying passage and a second position where said transparent member is exposed to an outside of said image reading apparatus in a state in which said cover unit is open, wherein in a state in which said reading unit is positioned in the first position, said transparent member faces downward in a vertical direction, and wherein in a state in which said reading unit is positioned in the second position, said transparent member faces upward in the vertical direction.

2. The image reading apparatus according to claim 1, further comprising a conveying guide provided to be rotatable relative to said main body and configured to guide the sheet conveyed by said sheet conveying member, said conveying guide forming the sheet conveying passage in cooperation with said cover unit, wherein said reading unit is rotatable independently of said conveying guide.

3. The image reading apparatus according to claim 2, wherein said cover unit is rotatable between a closed position where said cover unit forms the sheet conveying passage in cooperation with said conveying guide and an open position where the sheet conveying passage is open.

4. The image reading apparatus according to claim 2, wherein said reading unit further includes a pressing portion including an elastic member and a contacted portion to which said conveying guide is contactable, and is positioned in the first position by elasticity of said elastic member through urging of said conveying guide against said contacted portion, and wherein in a case that said reading unit is moved from the first position to the second position, said reading unit is buffered by the elasticity of said elastic member through contact of said contacted portion with a member fixed on a frame of said image reading apparatus.

5. The image reading apparatus according to claim 1, further comprising an arm member configured to move said reading unit, in contact with said reading unit, from the first position to the second position.

6. The image reading apparatus according to claim 5, further comprising a conveying guide configured to guide the sheet conveyed by said sheet conveying member, wherein said conveying guide is rotatable, relative to said main body, between a third position where said conveying guide covers said reading unit as viewed from above and a fourth position where said reading unit is exposed to the outside, and wherein said arm member is configured to move said reading unit from the first position to the second position interlocked with rotation of said conveying guide from the third position to the fourth position.

7. The image reading apparatus according to claim 5, further comprising:

an opposing member opposing said transparent member; and a gap forming member mounted on said transparent member and configured to form a gap between said transparent member and said opposing member in contact with said opposing member so that the sheet passes through the gap, wherein said arm member contacts said gap forming member.

8. The image reading apparatus according to claim 1, further comprising:

a stacking portion on which the sheet is stacked;

a feeding roller configured to feed the sheet stacked on said stacking portion;

a separation member provided on said conveying guide and configured to separate sheets fed by said feeding roller one by one; and a discharge portion provided below said stacking portion and onto which the sheet is discharged.

9. The image reading apparatus according to claim 8, wherein as viewed in a sheet widthwise direction, the sheet conveying passage is curved so that the sheet is fed from said stacking portion toward one side of a horizontal direction and is discharged toward the other side of the horizontal direction, wherein said reading unit is disposed inside the curved sheet conveying passage.

10. An image forming apparatus comprising:

an image reading apparatus configured to read image information from a sheet; and an image forming member configured to form an image on a recording material on the basis of the image information read by said image reading apparatus, wherein said image reading apparatus includes:

a main body;

a sheet conveying member configured to convey the sheet along a sheet conveying passage;

a cover unit provided to be rotatable relative to said main body and including an upper surface of said image reading apparatus; and a reading unit which includes a transparent member and a reading portion configured to read, through said transparent member, an image on the sheet conveyed by said sheet conveying member, wherein said reading unit is rotatable, relative to said main body, between a first position where said transparent member opposes the sheet conveying passage and a second position where said transparent member is exposed to an outside of said image reading apparatus in a state in which said cover unit is open, wherein in a state in which said reading unit is positioned in the first position, said transparent member faces downward in a vertical direction, and wherein in a state in which said reading unit is positioned in the second position, said transparent member faces upward in the vertical direction.

* * * * *